United States Patent
Shigiya et al.

(10) Patent No.: US 11,490,041 B2
(45) Date of Patent: Nov. 1, 2022

(54) PHOTOELECTRIC CONVERTER AND IMAGING SYSTEM

(71) Applicant: CANON KABUSHIKI KAISHA, Tokyo (JP)

(72) Inventors: Yoshiko Shigiya, Tokyo (JP); Noriyuki Shikina, Tokyo (JP); Shintaro Takenaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/466,068

(22) Filed: Sep. 3, 2021

(65) Prior Publication Data
US 2022/0086383 A1  Mar. 17, 2022

(30) Foreign Application Priority Data
Sep. 11, 2020  (JP) .............................. JP2020-152620

(51) Int. Cl.
*H04N 5/369* (2011.01)
*H04N 5/3745* (2011.01)
*H04N 5/378* (2011.01)

(52) U.S. Cl.
CPC ......... *H04N 5/37452* (2013.01); *H04N 5/378* (2013.01); *H04N 5/37455* (2013.01)

(58) Field of Classification Search
None
See application file for complete search history.

(56) References Cited

U.S. PATENT DOCUMENTS

| 7,999,866 | B2 | 8/2011 | Sonoda |
| 8,049,799 | B2 | 11/2011 | Sonoda |
| 8,081,246 | B2 | 12/2011 | Takenaka |
| 8,305,473 | B2 | 11/2012 | Takenaka |
| 8,363,137 | B2 | 1/2013 | Sonoda |
| 8,466,994 | B2 | 6/2013 | Takenaka |

(Continued)

FOREIGN PATENT DOCUMENTS

| JP | 2000-152085 A | 5/2000 |
| JP | 2015-216334 A | 12/2015 |

OTHER PUBLICATIONS

U.S. Appl. No. 17/474,305, filed Sep. 14, 2021, by Noriyuki Shikina et al.

*Primary Examiner* — Mark T Monk
(74) *Attorney, Agent, or Firm* — Venable LLP

(57) ABSTRACT

The photoelectric conversion device includes a pixel unit configured to output first and second signals from columns of first and second regions, and a processing circuit including a first processing circuit including first and third memories, a second processing circuit including second and fourth memories, and a data exchange circuit. The first memory stores the first and second signals output from the first region, and the second memory stores the first and second signals output from the second region. The data exchange circuit stores the first signals read out from the first and second memories in the third memory, and stores the second signals read out from the first and second memories in the fourth memory. The processing circuit outputs the first signals stored in the third memory from the first processing circuit, and outputs the second signals stored in the fourth memory from the second processing circuit.

14 Claims, 17 Drawing Sheets

(56) References Cited

U.S. PATENT DOCUMENTS

| | | |
|---|---|---|
| 8,670,058 B2 | 3/2014 | Hayashi |
| 9,654,697 B2 | 5/2017 | Takenaka |
| 9,843,752 B2 | 12/2017 | Yamamoto |
| 10,277,839 B2 | 4/2019 | Takenaka |
| 10,389,964 B2 | 8/2019 | Taniguchi |
| 10,547,794 B2 | 1/2020 | Takenaka |
| 10,645,316 B2 | 5/2020 | Shigiya |
| 10,659,713 B2 | 5/2020 | Shikina |
| 10,750,103 B2 | 8/2020 | Takenaka |
| 2011/0267513 A1 | 11/2011 | Sonoda |
| 2012/0013778 A1 | 1/2012 | Sonoda |
| 2015/0129744 A1 | 5/2015 | Sonoda |
| 2016/0073016 A1 | 3/2016 | Ohya |
| 2017/0040371 A1 | 2/2017 | Izuhara |
| 2019/0104260 A1 | 4/2019 | Izuhara |
| 2019/0342513 A1* | 11/2019 | Doege ............... H04N 5/3456 |
| 2020/0154067 A1 | 5/2020 | Igarashi |
| 2021/0044766 A1 | 2/2021 | Shikina |
| 2021/0067717 A1 | 3/2021 | Shigiya |
| 2021/0176421 A1 | 6/2021 | Shikina |
| 2021/0306577 A1 | 9/2021 | Shigiya |

\* cited by examiner

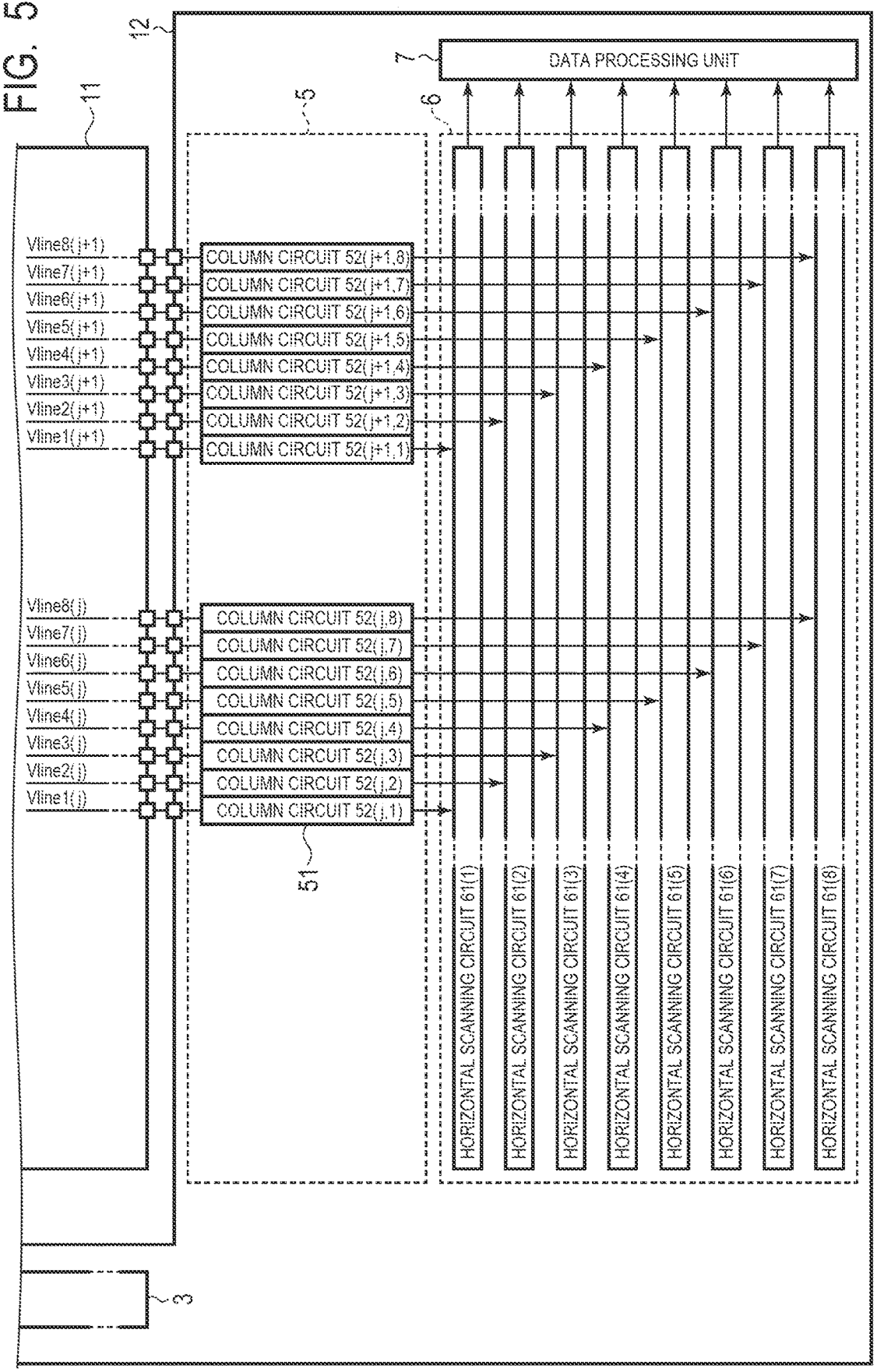

PHOTOELECTRIC CONVERTER AND IMAGING SYSTEM

BACKGROUND

Field

The present invention relates to a photoelectric conversion device and an imaging system.

Description of the Related Art

In a stacked photoelectric conversion device in which a pixel substrate provided with a pixel array and a signal processing substrate provided with a signal processing circuit are stacked, the signal processing circuit provided on the signal processing substrate may be divided into a plurality of regions. For example, a vertical scanning circuit may be disposed in a portion overlapping with the vicinity of the center of the pixel array for improvement in performance and convenience in manufacturing. In such a case, the column circuit unit and the data processing unit are divided into two in the horizontal direction and arranged on the signal processing substrate. Japanese Patent Application Laid-Open No. 2015-216334 discloses a solid-state imaging device in which a signal processing circuit is divided into two and arranged on a logic substrate.

When the column circuit corresponding to each column of the pixel array is divided in the horizontal direction, horizontal scanning is performed for each divided area to output data. When the data divided in the horizontal direction are combined, for example, as described in Japanese Patent Application Laid-Open No. 2015-216334, it is conceivable to collect the data in the data processing unit of one of the signal processing circuits.

However, when the signal processing circuit is configured in this manner, the other divided signal processing unit is not used. Further, when plural kinds of data independent from each other are read out from the pixel array and processed by the data processing unit, it is necessary to mount a circuit for processing plural kinds of data in one of the signal processing circuits, which increases the circuit scale.

SUMMARY

An object of the present disclosure is to provide a photoelectric conversion device and an imaging system capable of efficiently outputting pixel data without increasing the circuit scale.

According to an aspect of the present disclosure, there is provided a photoelectric conversion device including a pixel unit in which a plurality of pixels each including a photoelectric converter is arranged to form a plurality of rows and a plurality of columns, and a processing circuit configured to process a signal output from the pixel unit, wherein the pixel unit includes a first region and a second region defined by columns, and is configured to output a plurality of kinds of signals including a first signal and a second signal from each of columns belonging to the first region and the second region, wherein the processing circuit includes a first processing circuit including a first memory and a third memory, a second processing circuit including a second memory and a fourth memory, and a data exchange circuit, wherein the first memory is configured to store the first signal and the second signal output from each column of the first region, wherein the second memory is configured to store the first signal and the second signal output from each column of the second region, wherein the data exchange circuit is configured to read out the first signal stored in the first memory and the first signal stored in the second memory to store them in the third memory, and read out the second signal stored in the first memory and the second signal stored in the second memory to store them in the fourth memory, and wherein the processing circuit is configured to output the first signals of the first region and the second region stored in the third memory from the first processing circuit, and to output the second signals of the first region and the second region stored in the fourth memory from the second processing circuit.

Further features of the present invention will become apparent from the following description of exemplary embodiments with reference to the attached drawings.

BRIEF DESCRIPTION OF THE DRAWINGS

FIG. 5 is a diagram illustrating a connection relationship among a pixel unit, an AD conversion unit, and a horizontal scanning unit in the imaging device according to the first embodiment.

DESCRIPTION OF THE EMBODIMENTS

Preferred embodiments of the present invention will now be described in detail in accordance with the accompanying drawings.

First Embodiment

Figure 1:
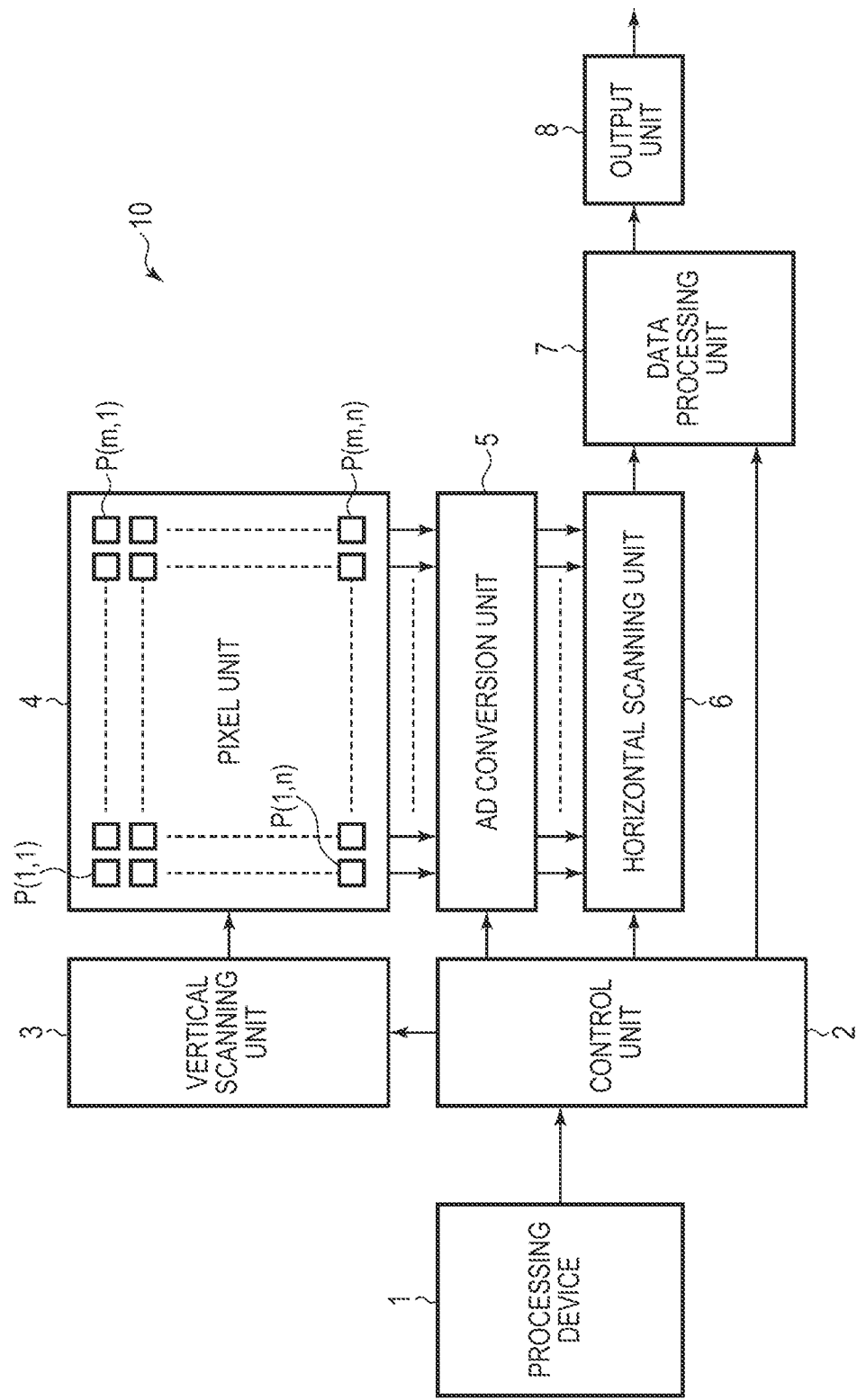
FIG. 1 is a block diagram illustrating a schematic configuration of an imaging device according to a first embodiment.
Figure 2:
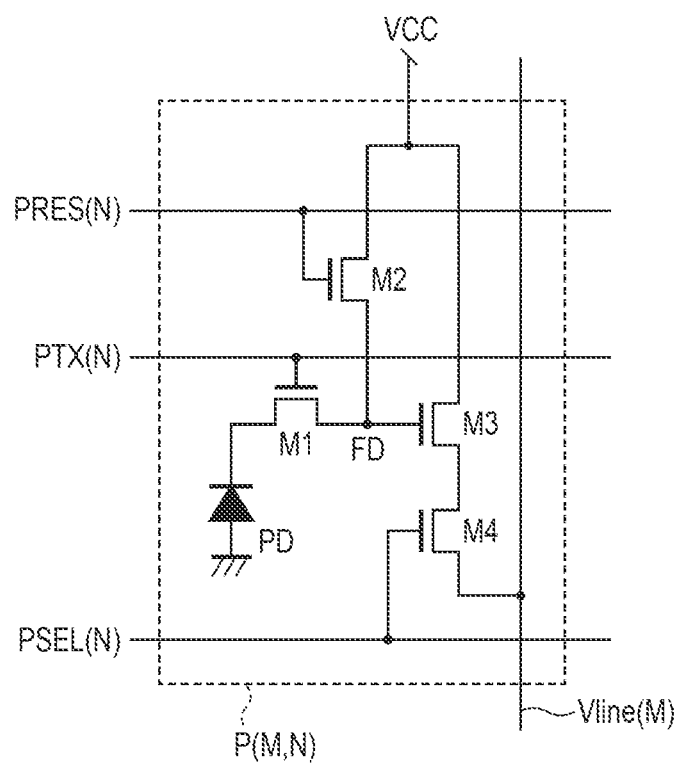
FIG. 2 is a circuit diagram illustrating a configuration example of a pixel in the imaging device according to the first embodiment.
Figure 3:
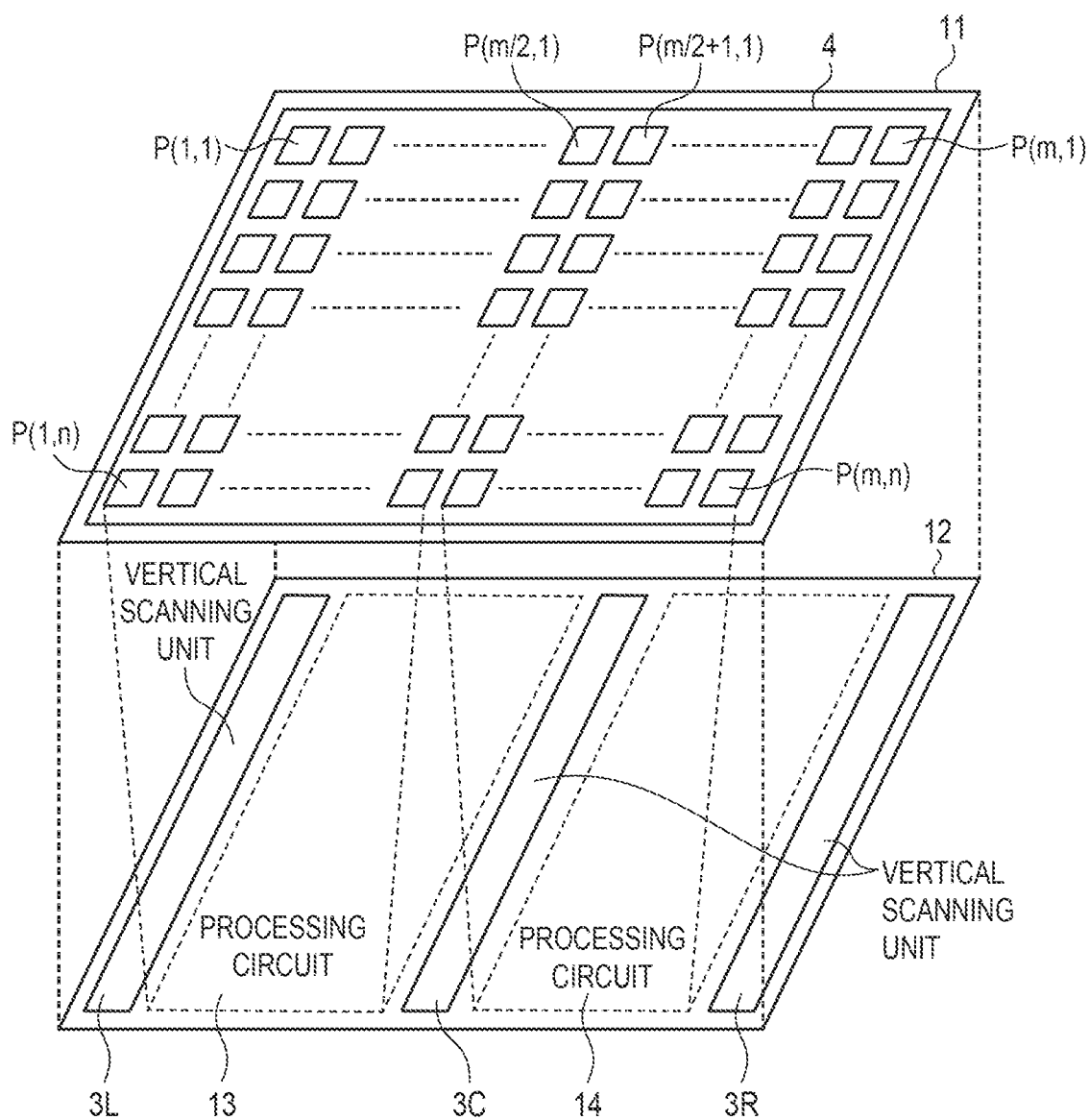
FIG. 3 is a perspective view schematically illustrating the imaging device according to the first embodiment.
Figure 4:
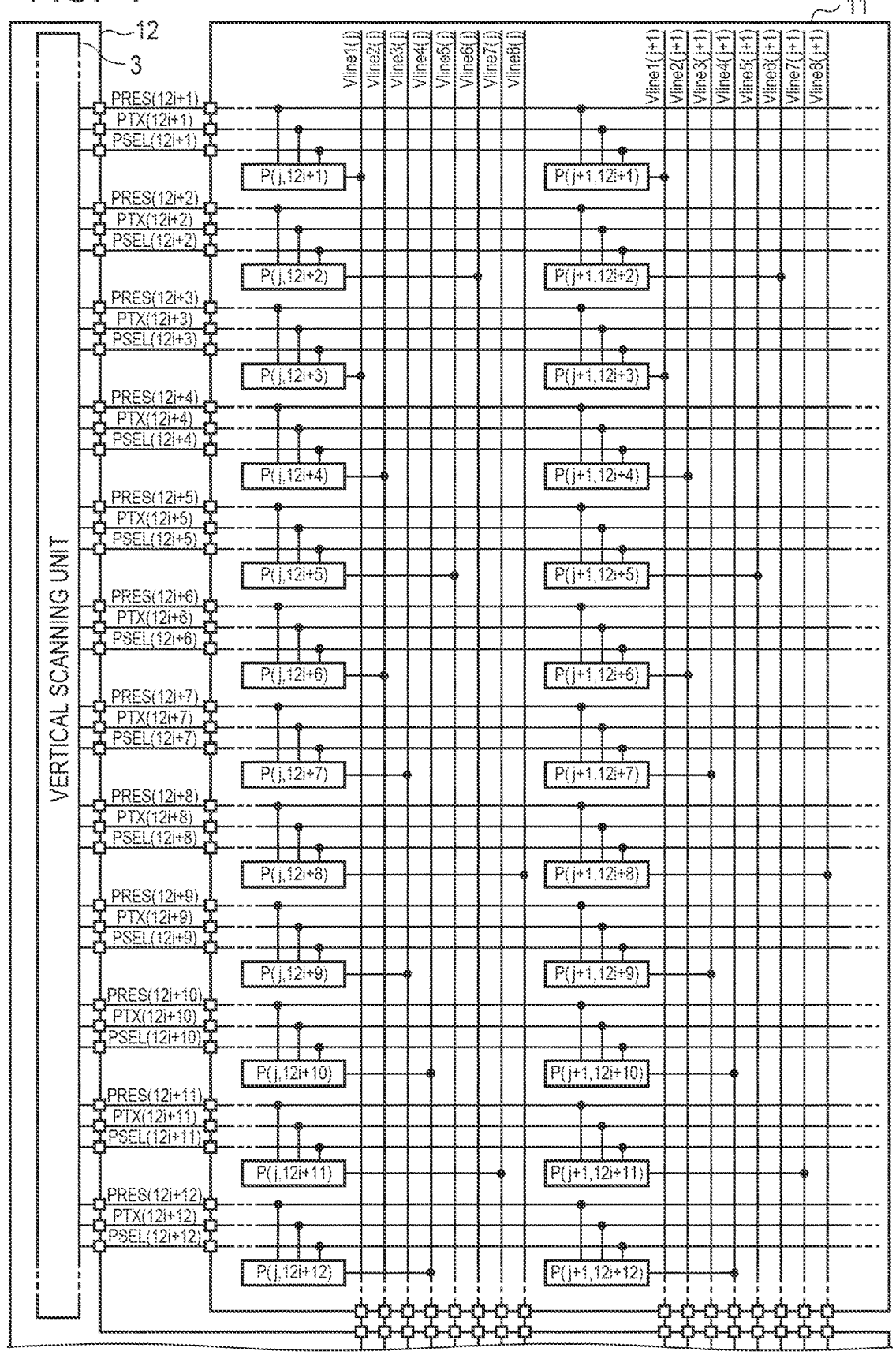
FIG. 4 is a diagram illustrating a connection relationship between a pixel unit and a vertical scanning unit in the imaging device according to the first embodiment.
Figure 6A:
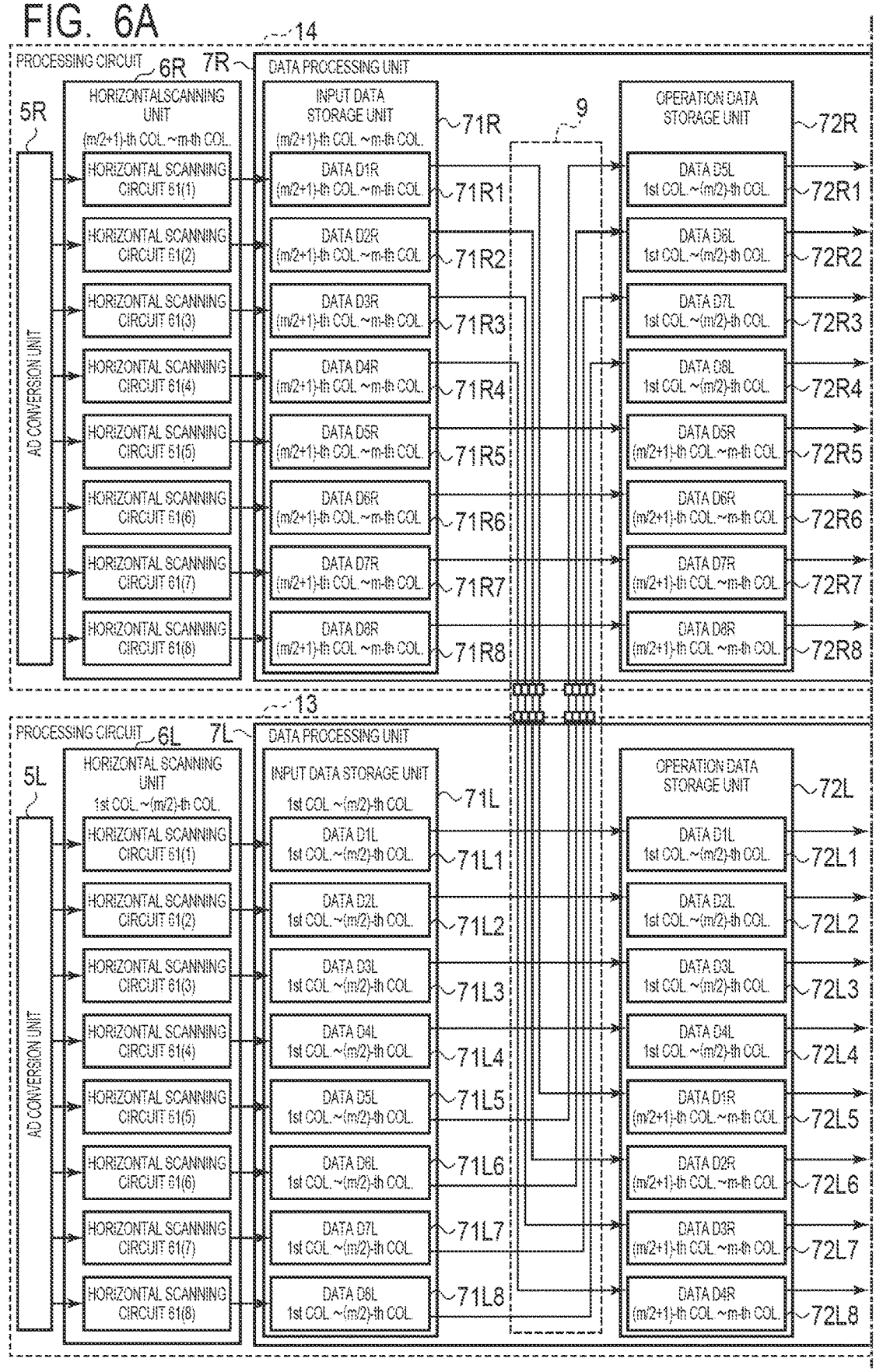
FIG. 6A and FIG. 6B are block diagrams illustrating a configuration example of processing circuits in the imaging device according to the first embodiment.
Figure 6B:
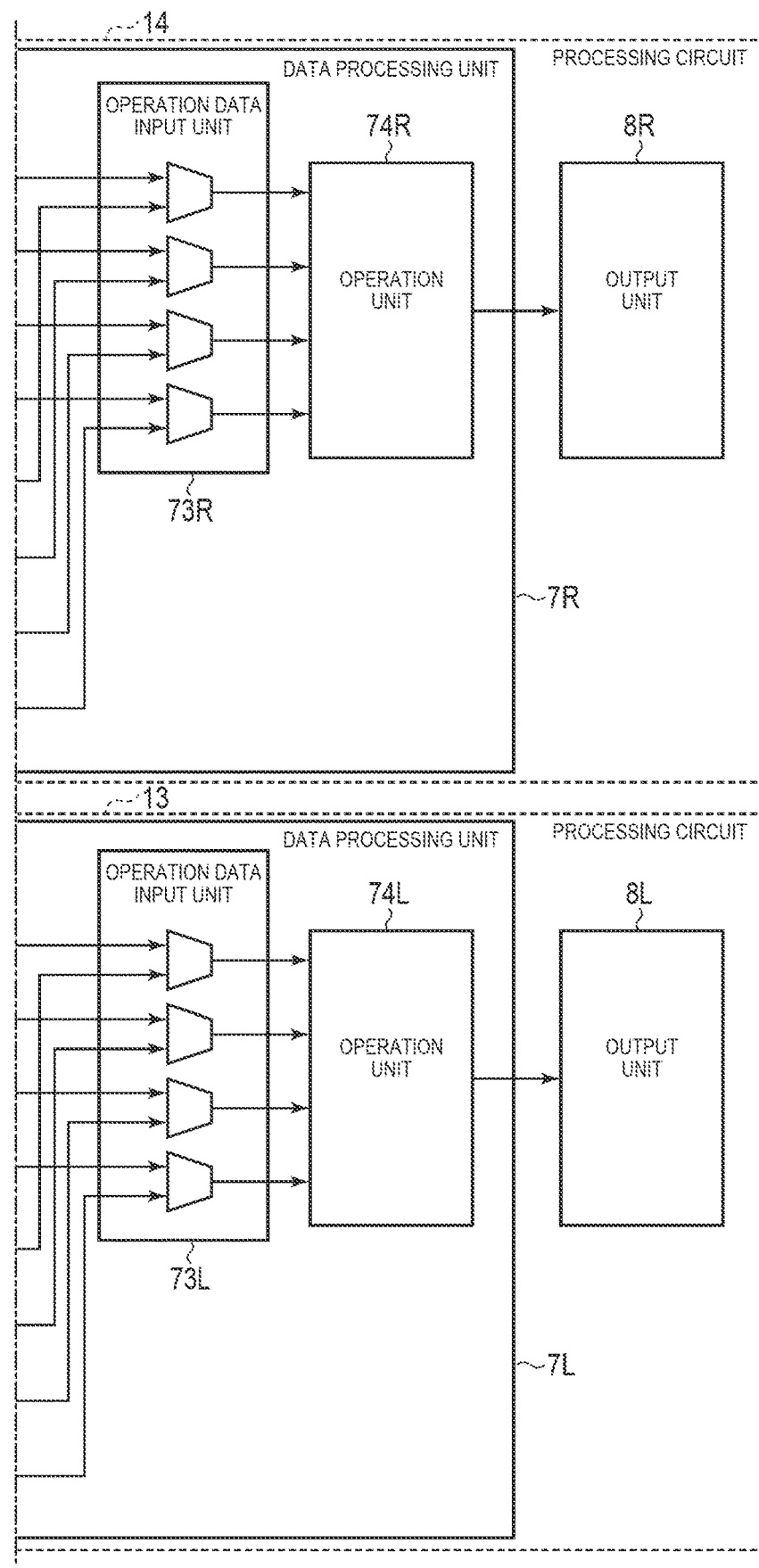

An imaging device according to a first embodiment will be described with reference to FIG. 1 to FIG. 6B. FIG. 1 is a block diagram illustrating a schematic configuration of an imaging device according to the present embodiment. FIG. 2 is a circuit diagram illustrating a configuration example of a pixel in the imaging device according to the present embodiment. FIG. 3 is a perspective view schematically illustrating the imaging device according to the present embodiment. FIG. 4 is a diagram illustrating a connection relationship between a pixel unit and a vertical scanning unit in the imaging device according to the present embodiment. FIG. 5 is a diagram illustrating a connection relationship among a pixel unit, an AD conversion unit, and a horizontal scanning unit in the imaging device according to the present embodiment. FIG. 6A and FIG. 6B are block diagrams illustrating a configuration example of processing circuits in the imaging device according to the present embodiment.

As illustrated in FIG. 1, for example, an imaging device 10 according to the present embodiment may include a processing device (processor) 1, a control unit 2, a vertical scanning unit 3, a pixel unit 4, an AD conversion unit (analog-to-digital conversion unit) 5, a horizontal scanning unit 6, a data processing unit 7, and an output unit 8. The vertical scanning unit 3 and the AD conversion unit 5 are connected to the pixel unit 4. A horizontal scanning unit 6 is connected to the AD conversion unit 5. A data processing unit 7 is connected to the horizontal scanning unit 6. An output unit 8 is connected to the data processing unit 7. A control unit 2 is connected to the vertical scanning unit 3, the AD conversion unit 5, the horizontal scanning unit 6, and the data processing unit 7. The processing device 1 is connected to the control unit 2.

The processing device 1 is, for example, a central processing unit (CPU), and controls the overall operation of the imaging device 10. The processing device 1 outputs a control signal such as a synchronization signal and a setting signal such as an operation mode to the control unit 2. The processing device 1 may be provided in an imaging system in which the imaging device 10 is mounted, that is, outside the imaging device 10.

The control unit 2 is a control circuit that receives control signals and setting signals from the processing device 1 and outputs control signals for controlling the operations and timings of the vertical scanning unit 3, the AD conversion unit 5, the horizontal scanning unit 6, and the data processing unit 7.

In the pixel unit 4, a plurality of pixels P each including a photoelectric converter are two-dimensionally arranged so as to form a plurality of rows and a plurality of columns. Each of the plurality of pixels P is configured to output a pixel signal corresponding to the amount of light incident on the photoelectric converter. FIG. 1 illustrates a pixel unit 4 including pixels P arranged in a matrix of m columns×n rows, and coordinates represented by (column numbers, row numbers) are added to reference numerals P of the pixels. Note that in this specification, an extending direction (row direction) of each row is defined as a horizontal direction, and an extending direction (column direction) of each column is defined as a vertical direction. It is also assumed that the row number of the head row is the first row, and the column number of the head column is the first column.

The vertical scanning unit 3 is a control circuit that operates in response to a signal from the control unit 2 and drives the plurality of pixels P constituting the pixel unit 4 in a row basis. The operations performed by the vertical scanning unit 3 for the plurality of pixels P constituting the pixel unit 4 include readout scan and shutter scan. The shutter scan refers to an operation of sequentially resetting the photoelectric converters on a row-by-row basis and starting exposure for a part or all of the pixels P of the pixel unit 4. The readout scan refers to an operation of sequentially outputting signals based on charges accumulated in the photoelectric converters on a row-by-row basis from the pixels P in a part or all of the rows of the pixel unit 4. The vertical scanning unit 3 supplies control signals to the pixels P on a row-by-row basis via control lines (not illustrated) arranged in respective rows of the pixel array. The vertical scanning unit 3 may be configured using a shift register or an address decoder.

The AD conversion unit 5 may include an amplifier circuit (not illustrated), an analog-to-digital conversion (AD conversion) circuit, and a memory. The AD conversion unit 5 performs amplification processing and AD conversion processing on a pixel signal which is an analog signal output from the pixel P of the pixel unit 4 via a vertical output line (not illustrated), and holds the pixel signal as digital data in the memory.

The horizontal scanning unit 6 is a control circuit that operates in response to a signal from the control unit 2 and sequentially transfers pixel signals converted into digital data by the AD conversion unit 5 to the data processing unit 7 on a column-by-column basis. The horizontal scanning unit 6 may be configured using a shift register or an address decoder.

The data processing unit 7 is a functional block that performs predetermined processing on digital data transferred from the horizontal scanning unit 6. A specific configuration of the data processing unit 7 and specific processing in the data processing unit 7 will be described later.

The output unit 8 is an output circuit that digitally processes the signal transferred from the data processing unit 7 and outputs the serial data to the outside of the imaging device 10. The output unit 8 may include a digital processing unit, a parallel/serial conversion circuit, and an output circuit such as LVDS (Low Voltage Differential Signaling).

In this specification, among these functional blocks constituting the imaging device 10, the control unit 2, the AD conversion unit 5, the horizontal scanning unit 6, the data processing unit 7, and the output unit 8 may be collectively referred to as a processing circuit.

FIG. 2 is a circuit diagram illustrating a configuration example of a pixel P. FIG. 2 exemplifies the pixels P (M, N) arranged in the M-th column and the N-th row of the pixel unit 4, but the same applies to other pixels P. Note that M is an integer greater than or equal to 1 and less than or equal to m, and N is an integer greater than or equal to 1 and less than or equal to n.

As illustrated in FIG. 2, each pixel P may include a photoelectric converter PD, a transfer transistor M1, a reset transistor M2, an amplifier transistor M3, and a select transistor M4.

The photoelectric converter PD may be configured by a photoelectric conversion element such as a photodiode or a photogate. Here, it is assumed that the photoelectric converter PD is formed of a photodiode. The photodiode constituting the photoelectric converter PD has an anode connected to the ground node and a cathode connected to the source of the transfer transistor M1. The drain of the transfer transistor M1 is connected to the source of the reset transistor M2 and the gate of the amplifier transistor M3. A connection node between the drain of the transfer transistor M1, the source of the reset transistor M2, and the gate of the amplifier transistor M3 is a so-called floating diffusion portion FD. The drain of the reset transistor M2 and the drain of the amplifier transistor M3 are connected to a power supply voltage node (voltage VCC). The source of the amplifier transistor M3 is connected to the drain of the select transistor M4. The source of the select transistor M4 is connected to the vertical output line Vline (M).

In the case of the pixel configuration illustrated in FIG. 2, each of the control lines arranged in each row of the pixel unit 4 includes a transfer gate signal line, a reset signal line, and a select signal line. For example, the transfer gate signal line of the N-th row is connected to the gates of the transfer transistors M1 of the pixels P of the N-th row, and supplies the control signal PTX (N) output from the vertical scanning unit 3 to the gates of the transfer transistors M1 of the pixels P. The reset signal line of the N-th row is connected to the gates of the reset transistors M2 of the pixels P of the N-th row, and supplies the control signal PRES (N) output from the vertical scanning unit 3 to the gates of the reset transistors M2 of the pixels P. The select signal line of the N-th row is connected to the gates of the select transistors M4 of the pixels P of the N-th row, and supplies the control signal PSEL (N) output from the vertical scanning unit 3 to the gates of the select transistors M4 of the pixels P. Common control signals are supplied from the vertical scanning unit 3 to the pixels P in the same row.

When each transistor is formed of an n-channel transistor, when a high-level control signal is supplied from the vertical scanning unit 3, the corresponding transistor is brought into a conductive state, and when a low-level control signal is supplied from the vertical scanning unit 3, the corresponding transistor is brought into a non-conductive state. Here, the high level corresponds to the logical value "1", and the low level corresponds to the logical value "0". Each transistor included in the pixel P may be configured by an n-channel transistor, but may be configured by a p-channel transistor.

The photoelectric converter PD converts (photoelectrically converts) the incident light into an amount of charge corresponding to the amount of light, and accumulates the generated charge. When the transfer transistor M1 is turned on (conductive state), the charge held by the photoelectric converter PD is transferred to the floating diffusion portion FD. The floating diffusion portion FD includes a capacitance component, holds charge transferred from the photoelectric converter PD, and sets the floating diffusion portion FD to a potential corresponding to the amount of charge by charge-voltage conversion by the capacitance component thereof. The amplifier transistor M3 has a configuration in which a voltage VCC is supplied to the drain thereof, and a bias current is supplied to the source thereof from a current source (not illustrated) via the vertical output line Vline and the select transistor M4, and constitutes a source follower circuit having a gate as an input node. Thus, the amplifier transistor M3 outputs a signal based on the potential of the floating diffusion portion FD to the vertical output line Vline via the select transistor M4. The reset transistor M2 is turned on to reset the floating diffusion portion FD to a potential corresponding to the power supply voltage. Further, by turning on (conductive state) the transfer transistor M1 simultaneously with the reset transistor M2, the photoelectric converter PD may be reset to a potential corresponding to the voltage VCC. The select transistor M4 switches the connection between the amplifier transistor M3 and the vertical output line Vline.

For example, as illustrated in FIG. 3, the imaging device 10 according to the present embodiment may be configured as a stacked sensor in which a pixel substrate 11 and a signal processing substrate 12 are stacked. For example, the pixel unit 4 of the functional blocks illustrated in FIG. 1 may be disposed on the pixel substrate 11. In addition, among the functional blocks illustrated in FIG. 1, for example, the control unit 2, the vertical scanning unit 3, the AD conversion unit 5, the horizontal scanning unit 6, the data processing unit 7, and the output unit 8 may be arranged on the signal processing substrate 12.

The vertical scanning unit 3 is divided into three blocks (vertical scanning units 3L, 3C, and 3R) and is arranged on the signal processing substrate 12. A processing circuit 13 is arranged between the vertical scanning unit 3L and the vertical scanning unit 3C, and a processing circuit 14 is arranged between the vertical scanning unit 3C and the vertical scanning unit 3R. The processing circuit 13 is provided with a processing circuit for processing the signals of the pixels P arranged in the first region defined by the columns among the pixels P arranged in the pixel unit 4. The processing circuit 14 is provided with a processing circuit for processing the signals of the pixels P arranged in the second region defined by the columns among the pixels P arranged in the pixel unit 4. Here, it is assumed that the range from the first column to the (m/2)-th column is the first region, and the range from the (m/2+1)-th column to the m-th column is the second region. Each of the control unit 2, the AD conversion unit 5, the horizontal scanning unit 6, the data processing unit 7, and the output unit 8 is divided into two blocks, and is divided into a processing circuit 13 and a processing circuit 14. The processing circuit 13 and the processing circuit 14 are spaced apart from each other.

As illustrated in FIG. 4, a signal line to which the control signal PRES is supplied, a signal line to which the control signal PTX is supplied, and a signal line to which the control signal PSEL is supplied are provided in each row of the pixel array constituting the pixel unit 4. These signal lines are connected to a plurality of pixels P arranged in a corresponding row. For example, the signal lines arranged in the ($12i$+1)-th row are connected to the pixels P (1, $12i$+1), . . . , P (j, $12i$+1), P (j+1, $12i$+1), P (j+2, $12i$+1), P (m, $12i$+1). Each of these signal lines is connected to the vertical scanning unit 3 provided on the signal processing substrate 12 via an electrical connection portion between the pixel substrate 11 and the signal processing substrate 12. Note that i is an integer of 0 or more in which the row number is in the range of 1 to n. In the first row to the n-th row, the same blocks as the ($12i$+1)-th row to the ($12i$+12)-th row are repeatedly arranged in units of 12 rows.

As illustrated in FIG. 4, a predetermined number of vertical output lines Vline are provided in each column of the pixel array constituting the pixel unit 4. In FIG. 4, it is assumed that eight vertical output lines Vline are provided in each column. For example, eight vertical output lines Vline of vertical output lines Vline1 ($j$), Vline2 ($j$), Vline3 ($j$), Vline4 ($j$), Vline5 ($j$), Vline6 ($j$), Vline7 ($j$) and Vline8 ($j$) are provided in the j-th column. The number of vertical output lines Vline provided in each column is not limited to eight, and may be appropriately increased or decreased. Note that j is an integer of 1 or more in which the column number is in the range of 1 to m.

A pixel P in the (12$i$+1)-th row and a pixel P in the (12$i$+3)-th row are connected to the vertical output line Vline1 in each column. A pixel P in the (12$i$+4)-th row and a pixel P in the (12$i$+6)-th row are connected to the vertical output line Vline2 in each column. A pixel P in the (12$i$+7)-th row and a pixel P in the (12$i$+9)-th row are connected to the vertical output line Vline3 in each column. A pixel P in the (12$i$+10)-th row and a pixel P in the (12$i$+12)-th row are connected to the vertical output line Vline4 in each column. A pixel P in the (12$i$+5)-th row is connected to the vertical output line Vline5 in each column. A pixel P in the (12$i$+2)-th row is connected to the vertical output line Vline6 in each column. A pixel P in the (12$i$+11)-th row is connected to the vertical output line Vline7 in each column. A pixel P in the (12$i$+8)-th row is connected to the vertical output line Vline8 in each column.

Pixel data obtained by adding pixel signals read out from a plurality of pixels P arranged in the vertical direction according to the control signals PRES, PTX, and PSEL supplied from the vertical scanning unit 3 is output to each of the vertical output lines Vline1, Vline2, Vline3, and Vline4. That is, pixel data obtained by adding the pixel signal of the pixel P in the (12$i$+1)-th row and the pixel signal of the pixel P in the (12$i$+3)-th row is read out to the vertical output line Vline1. Pixel data obtained by adding the pixel signal of the pixel P in the (12$i$+4)-th row and the pixel signal of the pixel P in the (12$i$+6)-th row is read out to the vertical output line Vline2. Pixel data obtained by adding the pixel signal of the pixel P in the (12$i$+7)-th row and the pixel signal of the pixel P in the (12$i$+9)-th row is read out to the vertical output line Vline3. Pixel data obtained by adding the pixel signal of the pixel P in the (12$i$+10)-th row and the pixel signal of the pixel P in the (12$i$+12)-th row is read out to the vertical output line Vline4.

Non-addition pixel data thinned out in the vertical direction according to the control signals PRES, PTX, and PSEL supplied from the vertical scanning unit 3 is output to each of the vertical output lines Vline5, Vline6, Vline7, and Vline8. That is, pixel data of the pixel P in the (12$i$+5)-th row is read out to the vertical output line Vline5. Pixel data of the pixel P in the (12$i$+2)-th row is read out to the vertical output line Vline6. Pixel data of the pixel P in the (12$i$+11)-th row is read out to the vertical output line Vline7. Pixel data of the pixel P in the (12$i$+8)-th row is read out to the vertical output line Vline8.

That is, the imaging device 10 of the present embodiment is configured to be able to read out two types of pixel data, i.e., pixel data obtained by adding pixel signals read out from a plurality of pixels P arranged in the vertical direction, and non-addition pixel data thinned out in the vertical direction. In other words, the imaging device 10 of the present embodiment is configured to output a plurality of types of signals including at least the first signal and the second signal from each column of the pixel unit 4. Here, the first signal is pixel data obtained by adding pixel signals read out from a first number (two) of pixels P arranged in the vertical direction. The second signal is pixel data obtained by adding pixel signals read out from a second number (one) of pixels P different from the first number arranged in the vertical direction.

As illustrated in FIG. 5, each vertical output line Vline is connected to the AD conversion unit 5 provided on the signal processing substrate 12 via an electrical connection portion between the pixel substrate 11 and the signal processing substrate 12. The AD conversion unit 5 includes a plurality of (m) column circuit groups 51 corresponding to respective columns of the pixel array constituting the pixel unit 4. Each of the column circuit groups 51 includes a plurality of (eight in the example of FIG. 5) column circuits 52 corresponding to the number of vertical output lines Vline arranged in a corresponding column. In other words, the AD conversion unit 5 includes m×8 column circuits 52 for a pixel array of n rows and m columns.

As illustrated in FIG. 5, the column circuit group 51 of the j-th column includes column circuits 52 ($j$, 1), 52 ($j$, 2), 52 ($j$, 3), 52 ($j$, 4), 52 ($j$, 5), 52 ($j$, 6), 52 ($j$, 7), and 52 ($j$, 8). The column circuit 52 ($j$, 1) is connected to the vertical output line Vline1 ($j$). The column circuit 52 ($j$, 2) is connected to the vertical output line Vline2 ($j$). The column circuit 52 ($j$, 3) is connected to the vertical output line Vline3 ($j$). The column circuit 52 ($j$, 4) is connected to the vertical output line Vline4 ($j$). The column circuit 52 ($j$, 5) is connected to the vertical output line Vline5 ($j$). The column circuit 52 ($j$, 6) is connected to the vertical output line Vline6 ($j$). The column circuit 52 ($j$, 7) is connected to the vertical output line Vline7 ($j$). The column circuit 52 ($j$, 8) is connected to the vertical output line Vline8 ($j$).

As described above, the AD conversion unit 5 is divided into two and arranged in the processing circuit 13 and the processing circuit 14. In the present embodiment, half of the m×8 column circuits 52 constituting the AD conversion unit 5 are arranged in the processing circuit 13, and the remaining half are arranged in the processing circuit 14. The vertical output lines Vline of the respective columns from the first column to the (m/2)-th column are connected to the column circuit 52 arranged in the processing circuit 13. The vertical output lines Vline of the respective columns from the (m/2+1)-th column to the m-th column are connected to the column circuit 52 arranged in the processing circuit 14.

The horizontal scanning unit 6 includes a plurality of (eight in the example of FIG. 5) horizontal scanning circuits 61 corresponding to the number of vertical output lines Vline and column circuits 52 arranged in each column of the pixel array constituting the pixel unit 4. The column circuits 52 belonging to the column circuit group 51 of the same column are connected to different horizontal scanning circuits 61. For example, as illustrated in FIG. 5, the horizontal scanning unit 6 includes horizontal scanning circuits 61 (1), 61 (2), 61 (3), 61 (4), 61 (5), 61 (6), 61 (7), and 61 (8). The column circuit (j, 1) of the j-th column is connected to the horizontal scanning circuit 61 (1). The column circuit (j, 2) of the j-th column is connected to the horizontal scanning circuit 61 (2). The column circuit (j, 3) of the j-th column is connected to the horizontal scanning circuit 61 (3). The column circuit (j, 4) of the j-th column is connected to the horizontal scanning circuit 61 (4). The column circuit (j, 5) of the j-th column is connected to the horizontal scanning circuit 61 (5). The column circuit (j, 6) of the j-th column is connected to the horizontal scanning circuit 61 (6). The column circuit (j, 7) of the j-th column is connected to the horizontal scanning circuit 61 (7). The column circuit (j, 8) of the j-th column is connected to the horizontal scanning circuit 61 (8).

As described above, the horizontal scanning unit 6 is divided into two and arranged in the processing circuit 13 and the processing circuit 14. The horizontal scanning circuit 61 arranged in the processing circuit 13 sequentially and horizontally transfers digital data of the pixels P from the first column to the (m/2)-th column, and outputs the digital data to the data processing unit 7 of the processing circuit 13. The horizontal scanning circuit 61 arranged in the processing circuit 14 sequentially horizontally transfers digital data of the pixels P from the (m/2+1)-th column to the m-th column, and outputs the digital data to the data processing unit 7 of the processing circuit 14.

Next, a configuration example of the processing circuit 13 and the processing circuit 14 in the imaging device 10 according to the present embodiment will be described in more detail with reference to FIG. 6A and FIG. 6B.

The processing circuit 13 includes an AD conversion unit 5L, a horizontal scanning unit 6L, a data processing unit 7L, and an output unit 8L. The processing circuit 14 includes an AD conversion unit 5R, a horizontal scanning unit 6R, a data processing unit 7R, and an output unit 8R. The AD conversion units 5L and 5R and the horizontal scanning units 6L and 6R are as described with reference to FIG. 4 and FIG. 5.

The data processing unit 7L may include an input data storage unit 71L, an operation data storage unit 72L, an operation data input unit 73L, and an operation unit 74L. Each of the input data storage unit 71L and the operation data storage unit 72L includes a plurality of memories corresponding to the number of horizontal scanning circuits 61L included in the horizontal scanning unit 6L. For example, the input data storage unit 71L includes eight memories 71L1, 71L2, 71L3, 71L4, 71L5, 71L6, 71L7 and 71L8, as illustrated in FIG. 6A. As illustrated in FIG. 6A, the operation data storage unit 72L includes eight memories 72L1, 72L2, 72L3, 72L4, 72L5, 72L6, 72L7 and 72L8.

Similarly, the data processing unit 7R may include an input data storage unit 71R, an operation data storage unit 72R, an operation data input unit 73R, and an operation unit 74R. Each of the input data storage unit 71R and the operation data storage unit 72R includes a plurality of memories corresponding to the number of horizontal scanning circuits 61R included in the horizontal scanning unit 6R. For example, the input data storage unit 71R includes eight memories 71R1, 71R2, 71R3, 71R4, 71R5, 71R6, 71R7 and 71R8, as illustrated in FIG. 6A. As illustrated in FIG. 6A, the operation data storage unit 72R includes eight memories 72R1, 72R2, 72R3, 72R4, 72R5, 72R6, 72R7 and 72R8.

The horizontal scanning circuits 61 (1) to 61 (8) of the horizontal scanning unit 6L are connected to the memories 71L1 to 71L8 of the input data storage unit 71L, respectively. The horizontal scanning circuits 61 (1) to 61 (8) of the horizontal scanning unit 6R are connected to the memories 71R1 to 71R8 of the input data storage unit 71R, respectively.

The input data storage units 71L and 71R and the operation data storage units 72L and 72R are connected via the data exchange circuit 9. Specifically, the memories 71L1 to 71L4 of the input data storage unit 71L are connected to the memories 72L1 to 72L4 of the operation data storage unit 72L. The memories 71L5 to 71L8 of the input data storage unit 71L are connected to the memories 72R1 to 72R4 of the operation data storage unit 72R. The memories 71R1 to 71R4 of the input data storage unit 71R are connected to the memories 72L5 to 72L8 of the operation data storage unit 72L. The memories 71R5 to 71R8 of the input data storage unit 71R are connected to the memories 72R5 to 72R8 of the operation data storage unit 72R. The data exchange circuit 9 may be configured by, for example, a bus. In this case, for example, data transfer between memories is possible by serial transfer on a pixel-by-pixel basis.

As illustrated in FIG. 6B, the operation data input unit 73L is connected to the operation unit 74L. The operation unit 74L is connected to the output unit 8L. Similarly, the operation data input unit 73R is connected to the operation unit 74R. The operation unit 74R is connected to the output unit 8R.

Next, the operation of the processing circuits 13 and 14 will be described with reference to FIG. 6A and FIG. 6B.

The pixel data read out from the vertical output line Vline1 of each column from the first column to the (m/2)-th column is sequentially transferred by the horizontal scanning circuit 61 (1) of the horizontal scanning unit 6L and stored in the memory 71L1 of the input data storage unit 71L. This data is called data D1L.

The pixel data read out from the vertical output line Vline2 of each column from the first column to the (m/2)-th column is sequentially transferred by the horizontal scanning circuit 61 (2) of the horizontal scanning unit 6L and stored in the memory 71L2 of the input data storage unit 71L. This data is called data D2L.

The pixel data read out from the vertical output line Vline3 of each column from the first column to the (m/2)-th column is sequentially transferred by the horizontal scanning circuit 61 (3) of the horizontal scanning unit 6L and stored in the memory 71L3 of the input data storage unit 71L. This data is called data D3L.

The pixel data read out from the vertical output line Vline4 of each column from the first column to the (m/2)-th column is sequentially transferred by the horizontal scanning circuit 61 (4) of the horizontal scanning unit 6L and stored in the memory 71L4 of the input data storage unit 71L. This data is called data D4L.

The pixel data read out from the vertical output line Vline5 of each column from the first column to the (m/2)-th column is sequentially transferred by the horizontal scanning circuit 61 (5) of the horizontal scanning unit 6L and stored in the memory 71L5 of the input data storage unit 71L. This data is called data DSL.

The pixel data read out from the vertical output line Vline6 of each column from the first column to the (m/2)-th column is sequentially transferred by the horizontal scanning circuit 61 (6) of the horizontal scanning unit 6L and stored in the memory 71L6 of the input data storage unit 71L. This data is called data D6L.

The pixel data read out from the vertical output line Vline7 of each column from the first column to the (m/2)-th column is sequentially transferred by the horizontal scanning circuit 61 (7) of the horizontal scanning unit 6L and stored in the memory 71L7 of the input data storage unit 71L. This data is called data D7L.

The pixel data read out from the vertical output line Vline8 of each column from the first column to the (m/2)-th column is sequentially transferred by the horizontal scanning circuit 61 (8) of the horizontal scanning unit 6L and stored in the memory 71L8 of the input data storage unit 71L. This data is called data D8L.

Similarly, the pixel data read out from the vertical output line Vline1 of each column from the (m/2+1)-th column to the m-th column is sequentially transferred by the horizontal scanning circuit 61 (1) of the horizontal scanning unit 6R and stored in the memory 71R1 of the input data storage unit 71R. This data is called data D1R.

The pixel data read out from the vertical output line Vline2 of each column from the (m/2+1)-th column to the m-th column is sequentially transferred by the horizontal scanning circuit 61 (2) of the horizontal scanning unit 6R and stored in the memory 71R2 of the input data storage unit 71R. This data is called data D2R.

The pixel data read out from the vertical output line Vline3 of each column from the (m/2+1)-th column to the m-th column is sequentially transferred by the horizontal scanning circuit 61 (3) of the horizontal scanning unit 6R and stored in the memory 71R3 of the input data storage unit 71R. This data is called data D3R.

The pixel data read out from the vertical output line Vline4 of each column from the (m/2+1)-th column to the m-th column is sequentially transferred by the horizontal scanning circuit 61 (4) of the horizontal scanning unit 6R and stored in the memory 71R4 of the input data storage unit 71R. This data is called data D4R.

The pixel data read out from the vertical output line Vline5 of each column from the (m/2+1)-th column to the m-th column is sequentially transferred by the horizontal scanning circuit 61 (5) of the horizontal scanning unit 6R and stored in the memory 71R5 of the input data storage unit 71R. This data is called data D5R.

The pixel data read out from the vertical output line Vline6 of each column from the (m/2+1)-th column to the m-th column is sequentially transferred by the horizontal scanning circuit 61 (6) of the horizontal scanning unit 6R and stored in the memory 71R6 of the input data storage unit 71R. This data is called data D6R.

The pixel data read out from the vertical output line Vline7 of each column from the (m/2+1)-th column to the m-th column is sequentially transferred by the horizontal scanning circuit 61 (7) of the horizontal scanning unit 6R and stored in the memory 71R7 of the input data storage unit 71R. This data is called data D7R.

The pixel data read out from the vertical output line Vline8 of each column from the (m/2+1)-th column to the m-th column is sequentially transferred by the horizontal scanning circuit 61 (8) of the horizontal scanning unit 6R and stored in the memory 71R8 of the input data storage unit 71R. This data is called data D8R.

Among the data stored in the input data storage unit 71L, the data D1L to D4L stored in the memories 71L1 to 71L4 are transferred to the memories 72L1 to 72L4 of the operation data storage unit 72L, respectively. Among the data stored in the input data storage unit 71L, the data D5L to D8L stored in the memories 71L5 to 71L8 are transferred to the memories 72R1 to 72R4 of the operation data storage unit 72R, respectively.

Among the data stored in the input data storage unit 71R, the data D1R to D4R stored in the memories 71R1 to 71R4 are transferred to the memories 72L5 to 72L8 of the operation data storage unit 72L, respectively. Among the data stored in the input data storage unit 71R, the data D5R to D8R stored in the memories 71R5 to 71R8 are transferred to the memories 72R5 to 72R8 of the operation data storage unit 72R, respectively.

That is, in the present embodiment, the data D5L, D6L, D7L, and D8L are transferred from the processing circuit 13 to the processing circuit 14, and the data D1R, D2R, D3R, and D4R are transferred from the processing circuit 14 to the processing circuit 13.

Thus, the operation data storage unit 72L stores pixel data (Data D1L, D2L, D3L, D4L, D1R, D2R, D3R, D4R) from the first column to the m-th column corresponding to the vertical output lines Vline1, Vline2, Vline3, and Vline4. The operation data storage unit 72R stores pixel data (Data D5L, D6L, D7L, D8L, D5R, D6R, D7R, D8R) from the first column to the m-th column corresponding to the vertical output lines Vline5, Vline6, Vline7, and Vline8.

The pixel data corresponding to the vertical output lines Vline1, Vline2, Vline3, and Vline4 stored in the operation data storage unit 72L in this manner is pixel data obtained by adding pixels in the vertical direction. On the other hand, the pixel data corresponding to the vertical output lines Vline5, Vline6, Vline7, and Vline8, which are stored in the operation data storage unit 72R in this manner, are non-addition pixel data thinned out in the vertical direction. That is, data corresponding to two different types of pixel readout methods may be separately stored in the operation data storage unit 72L and the operation data storage unit 72R.

The data stored in the operation data storage unit 72L is read out by the operation data input unit 73L, subjected to operation processing by the operation unit 74L, and output from the output unit 8L. Similarly, the data stored in the operation data storage unit 72R is read out by the operation data input unit 73R, subjected to operation processing by the operation unit 74R, and output from the output unit 8R. Since the operation unit 74L and the operation unit 74R are independent from each other, different operation processes may be performed simultaneously in each of the operation units 74L and 74R. Thus, all the divided data processing units 7L and 7R may be used to separate and simultaneously output data corresponding to two different types of pixel readout methods.

As described above, according to the present embodiment, efficient processing of pixel data may be realized without increasing the circuit scale.

Second Embodiment

Figure 7A:
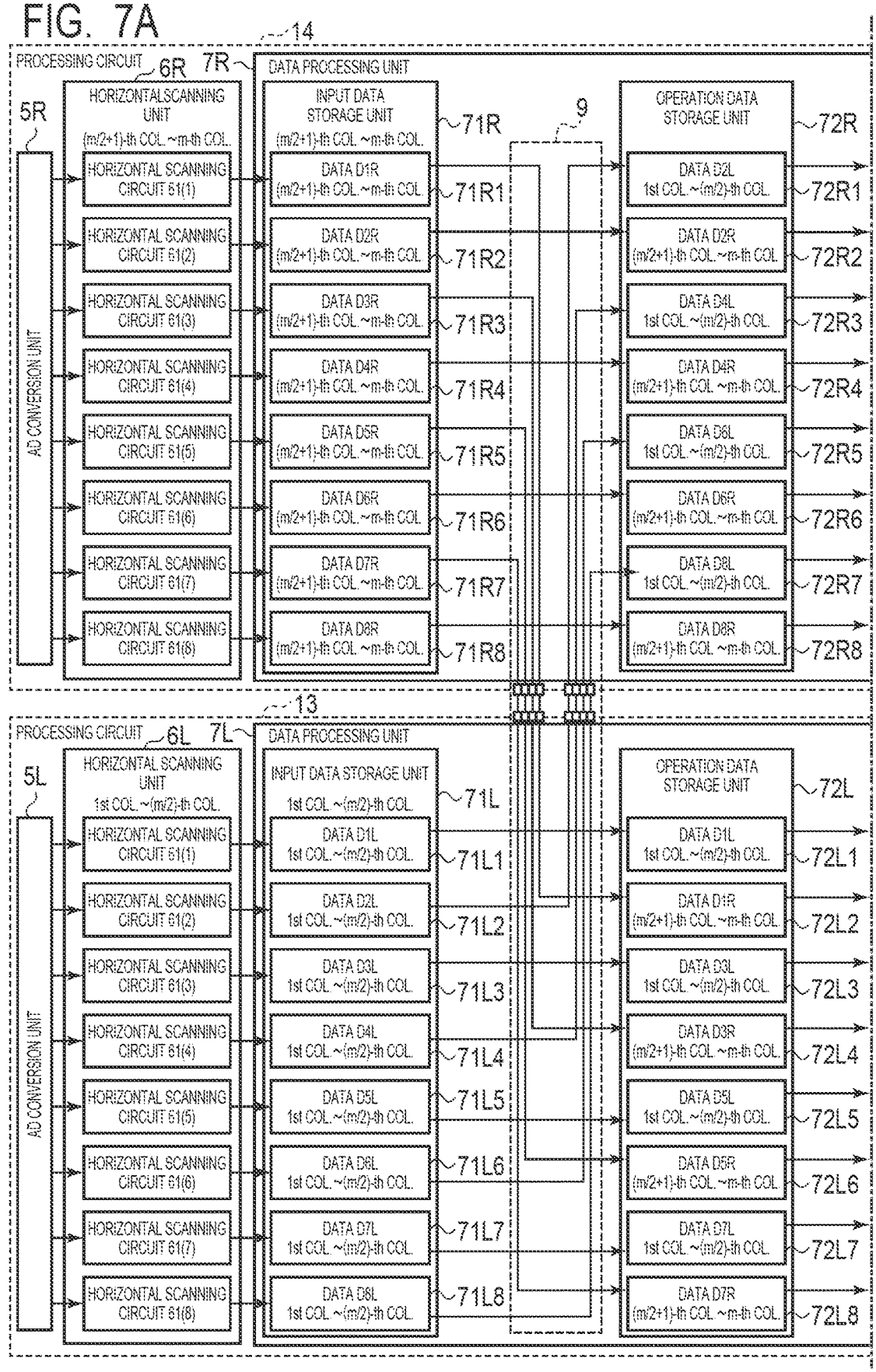
FIG. 7A and FIG. 7B are block diagrams illustrating a configuration example of processing circuits in an imaging device according to a second embodiment.
Figure 7B:
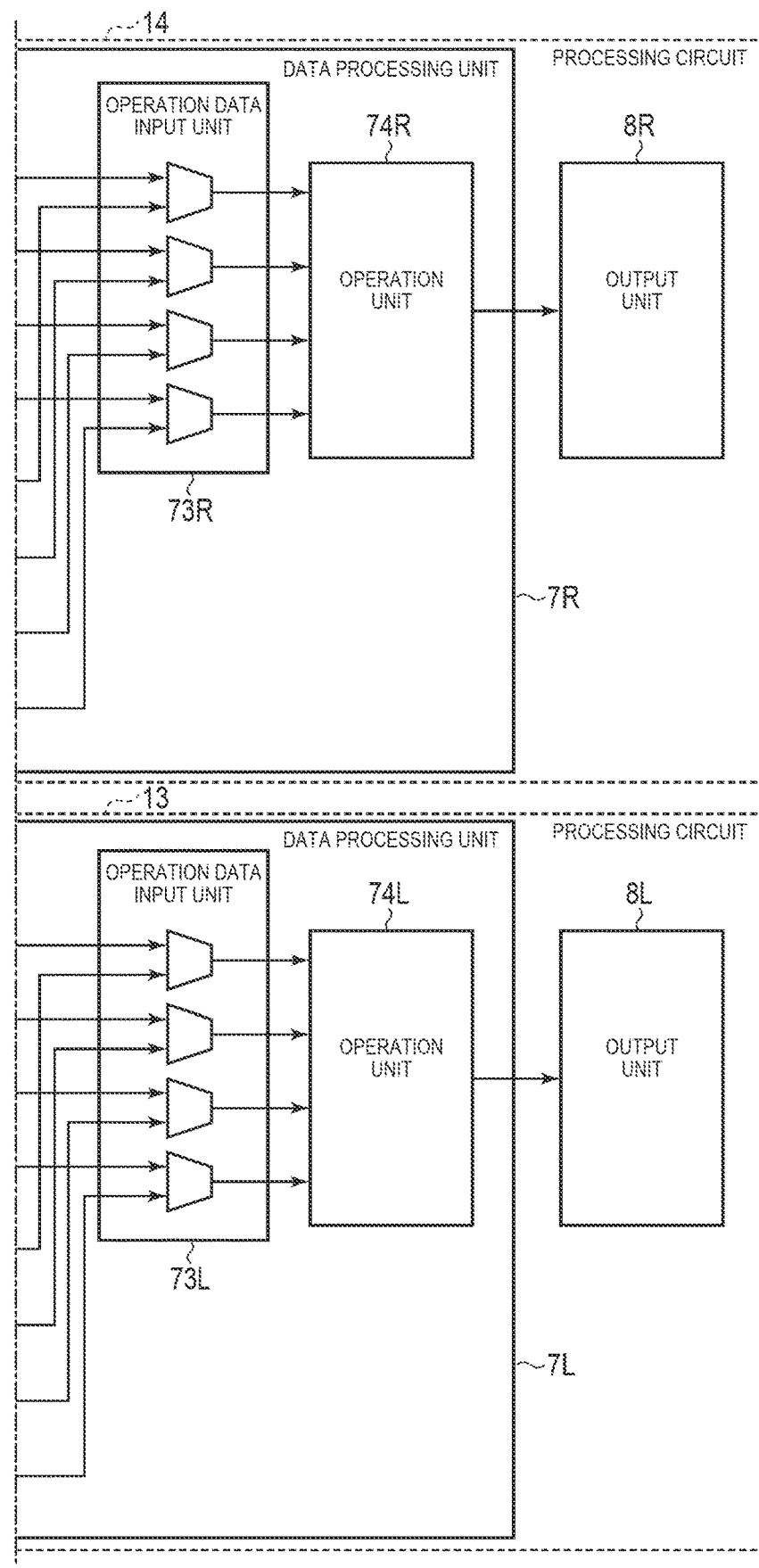

An imaging device according to a second embodiment will be described with reference to FIG. 7A and FIG. 7B. FIG. 7A and FIG. 7B are block diagrams illustrating a configuration example of a processing circuit in the imaging device according to the present embodiment. The same components as those of the imaging device according to the first embodiment are denoted by the same reference numerals, and the description thereof will be omitted or simplified.

In the first embodiment, data is divided and output according to two types of pixel readout methods of vertical addition and non-addition. In the present embodiment, an example will be described in which pixel data of R/Gr rows and pixel data of Gb/B rows are separated and output in an imaging device having a pixel array of a Bayer arrangement. The R/Gr row is a row in which pixels (R pixels) having red color filters and pixels (G pixels) having green color filters are alternately arranged. The Gb/B row is a row in which G pixels and pixels (B pixels) having blue color filters are alternately arranged. The R/Gr row and the Gb/B row are alternately arranged. For example, in the pixel array of FIG. 1, the pixel P (1, 1) is an R pixel, the pixel P (2, 1) is a G pixel, the pixel P (1, 2) is a G pixel, and the pixel P (2, 2) is a B pixel. Pixels P in adjacent rows in the same column are pixels of different colors.

The imaging device according to the present embodiment is the same as the imaging device 10 according to the first embodiment except that the data processing units 7L and 7R have different configurations. Hereinafter, the imaging device according to the present embodiment will be described focusing on points different from the imaging device according to the first embodiment.

As in the first embodiment, the data processing unit 7L in the imaging device according to the present embodiment includes an input data storage unit 71L, an operation data storage unit 72L, an operation data input unit 73L, and an operation unit 74L. As in the first embodiment, the data processing unit 7R in the imaging device according to the present embodiment includes an input data storage unit 71R, an operation data storage unit 72R, an operation data input unit 73R, and an operation unit 74R. The data processing units 7L and 7R of the present embodiment are different from those of the first embodiment in the connection between the input data storage units 71L and 71R and the operation data storage units 72L and 72R in the data exchange circuit 9.

That is, in the present embodiment, the memory 71L1, 71L3, 71L5 and 71L7 of the input data storage unit 71L is connected to the memory 72L1, 72L3, 72L5 and 72L7 of the operation data storage unit 72L. The memory 71L2, 71L4, 71L6 and 71L8 of the input data storage unit 71L is connected to the memory 72R1, 72R3, 72R5 and 72R7 of the operation data storage unit 72R. The memory 71R1, 71R3, 71R5 and 71R7 of the input data storage unit 71R is connected to the memory 72L2, 72L4, 72L6 and 72L8 of the operation data storage unit 72L. The memory 71R2, 71R4, 71R6 and 71R8 of the input data storage unit 71R is connected to the memory 72R2, 72R4, 72R6 and 72R8 of the operation data storage unit 72R.

Thus, the data D1L, D3L, D5L, and D7L stored in the memory 71L1, 71L3, 71L5 and 71L7 of the input data storage unit 71L are transferred to the memory 72L1, 72L3, 72L5 and 72L7 of the operation data storage unit 72L, respectively. The data D2L, D4L, D6L, and D8L stored in the memory 71L2, 71L4, 71L6 and 71L8 of the input data storage unit 71L are transferred to the memory 72R1, 72R3, 72R5 and 72R7 of the operation data storage unit 72R, respectively.

The data D1R, D3R, D5R, and D7R stored in the memory 71R1, 71R3, 71R5 and 71R7 of the input data storage unit 71R are transferred to the memory 72L2, 72L4, 72L6 and 72L8 of the operation data storage unit 72L, respectively. The data D2R, D4R, D6R, and D8R stored in the memory 71R2, 71R4, 71R6 and 71R8 of the input data storage unit 71R are transferred to the memory 72R2, 72R4, 72R6 and 72R8 of the operation data storage unit 72R, respectively.

That is, in the present embodiment, the data D2L, D4L, D6L, and D8L are transferred from the processing circuit 13 to the processing circuit 14, and the data D1R, D3R, D5R, and D7R are transferred from the processing circuit 14 to the processing circuit 13.

Thus, the operation data storage unit 72L stores pixel data (Data D1L, D3L, D5L, D7L, D1R, D3R, D5R, D7R) from the first column to the m-th column corresponding to the vertical output lines Vline1, Vline3, Vline5 and Vline7. The operation data storage unit 72R stores pixel data (Data D2L, D4L, D6L, D8L, D2R, D4R, D6R, D8R) from the first column to the m-th column corresponding to the vertical output lines Vline2, Vline4, Vline6, and Vline8.

In the pixel array of FIG. 4, R/Gr rows are, for example, $(12i+1)$-th row, $(12i+3)$-th row, $(12i+5)$-th row, $(12i+7)$-th row, $(12i+9)$-th row, and $(12i+11)$-th row. The Gb/B row is, for example, $(12i+2)$-th row, $(12i+4)$-th row, $(12i+6)$-th row, $(12i+8)$-th row, $(12i+10)$-th row, and $(12i+12)$-th row. Therefore, the data output to the vertical output lines Vline1, Vline3, Vline5, and Vline7 are data of R/Gr rows, and the data output to the vertical output lines Vline2, Vline4, Vline6, and Vline8 are data of Gb/B rows.

By configuring the data processing unit 7 in this way, the data of the R/Gr row may be stored in the operation data storage unit 72L, and the data of the Gb/B row may be stored in the operation data storage unit 72R. Thus, the data in the R/Gr row and the data in the Gb/B row may be separated and output simultaneously.

The data stored in the operation data storage unit 72L is read out by the operation data input unit 73L, subjected to operation processing by the operation unit 74L, and output from the output unit 8L. Similarly, the data stored in the operation data storage unit 72R is read out by the operation data input unit 73R, subjected to operation processing by the operation unit 74R, and output from the output unit 8R. Since the operation unit 74L and the operation unit 74R are independent from each other, different operation processes may be performed simultaneously in each of the operation units 74L and 74R. Thus, all the divided data processing units 7L and 7R may be used to separate and simultaneously output data corresponding to two different types of pixel readout methods.

As described above, according to the present embodiment, efficient processing of pixel data may be realized without increasing the circuit scale.

Third Embodiment

Figure 8:
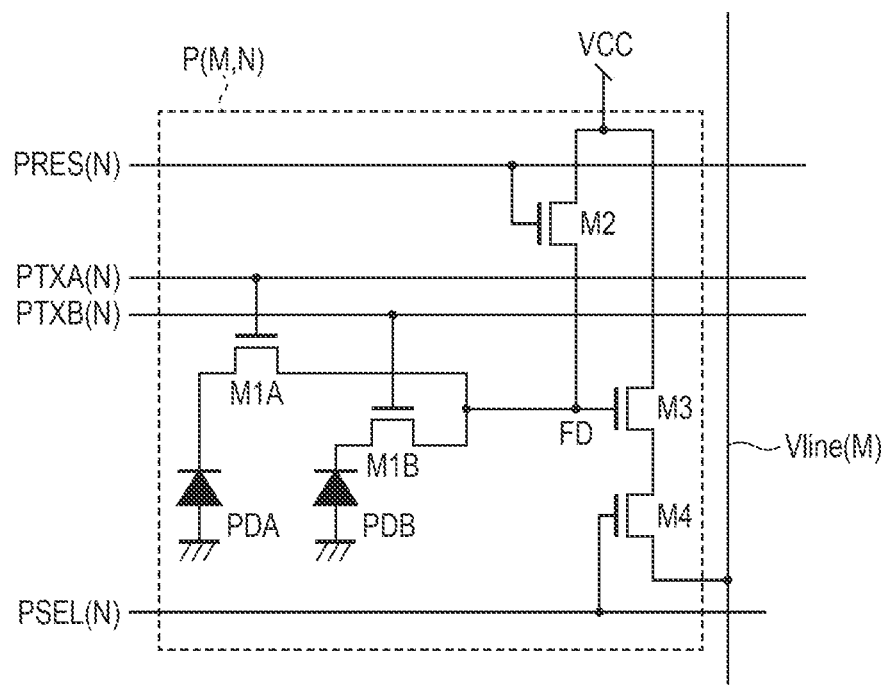
FIG. 8 is a circuit diagram illustrating a configuration example of a pixel in an imaging device according to a third embodiment.
Figure 9:
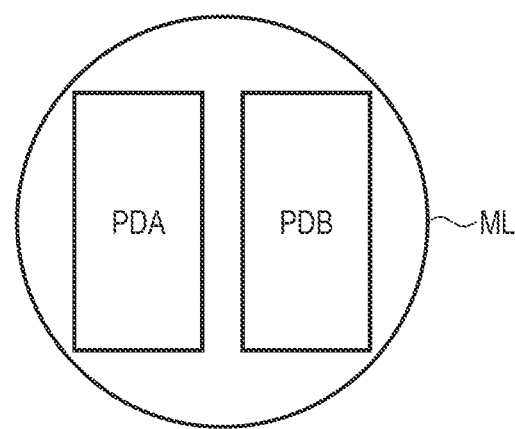
FIG. 9 is a schematic top view of the pixel in an imaging device according to the third embodiment.
Figure 10:
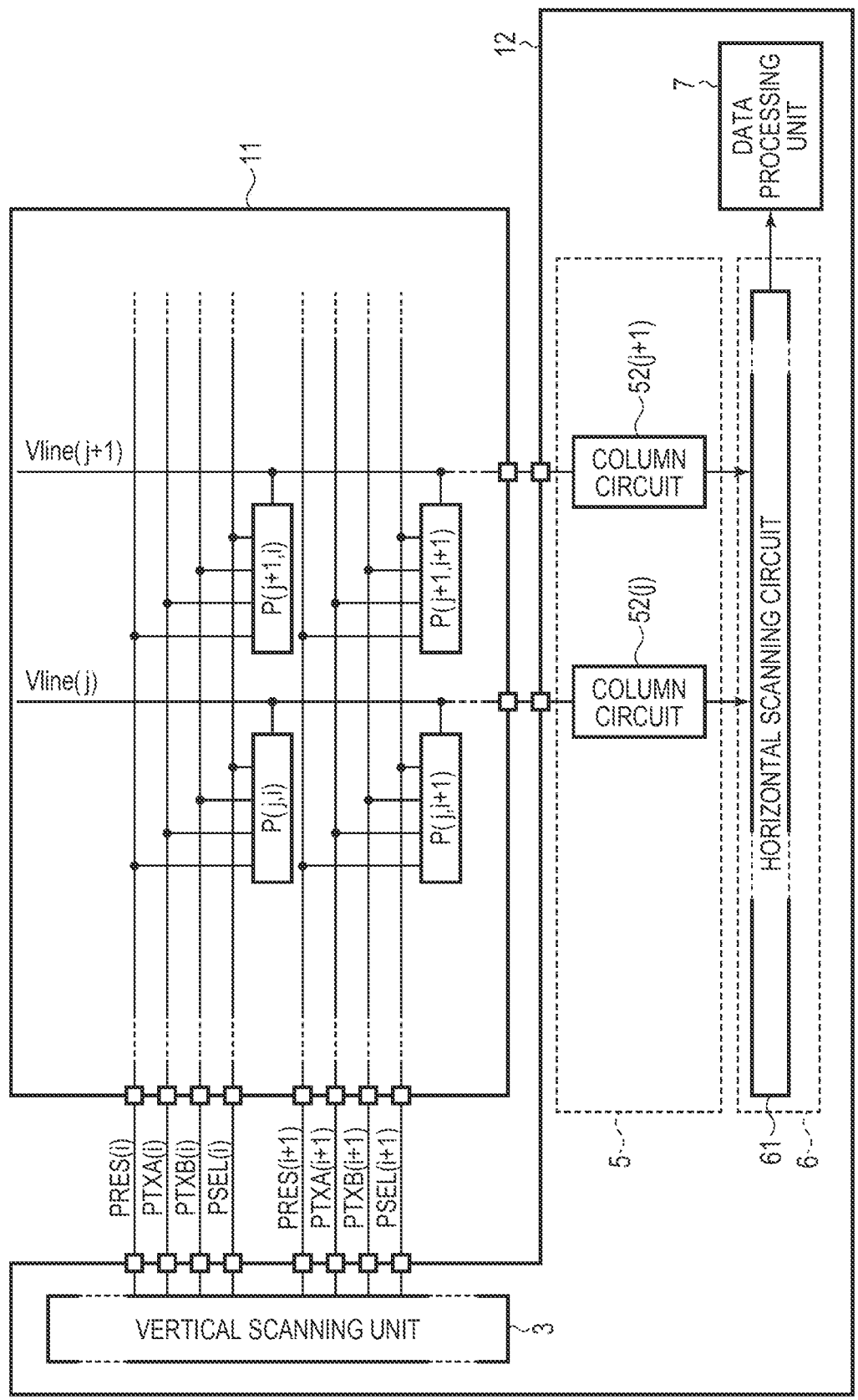
FIG. 10 is a diagram illustrating a connection relationship among a pixel unit, a vertical scanning unit, an AD conversion unit, and a horizontal scanning unit in the imaging device according to the third embodiment.
Figure 11:
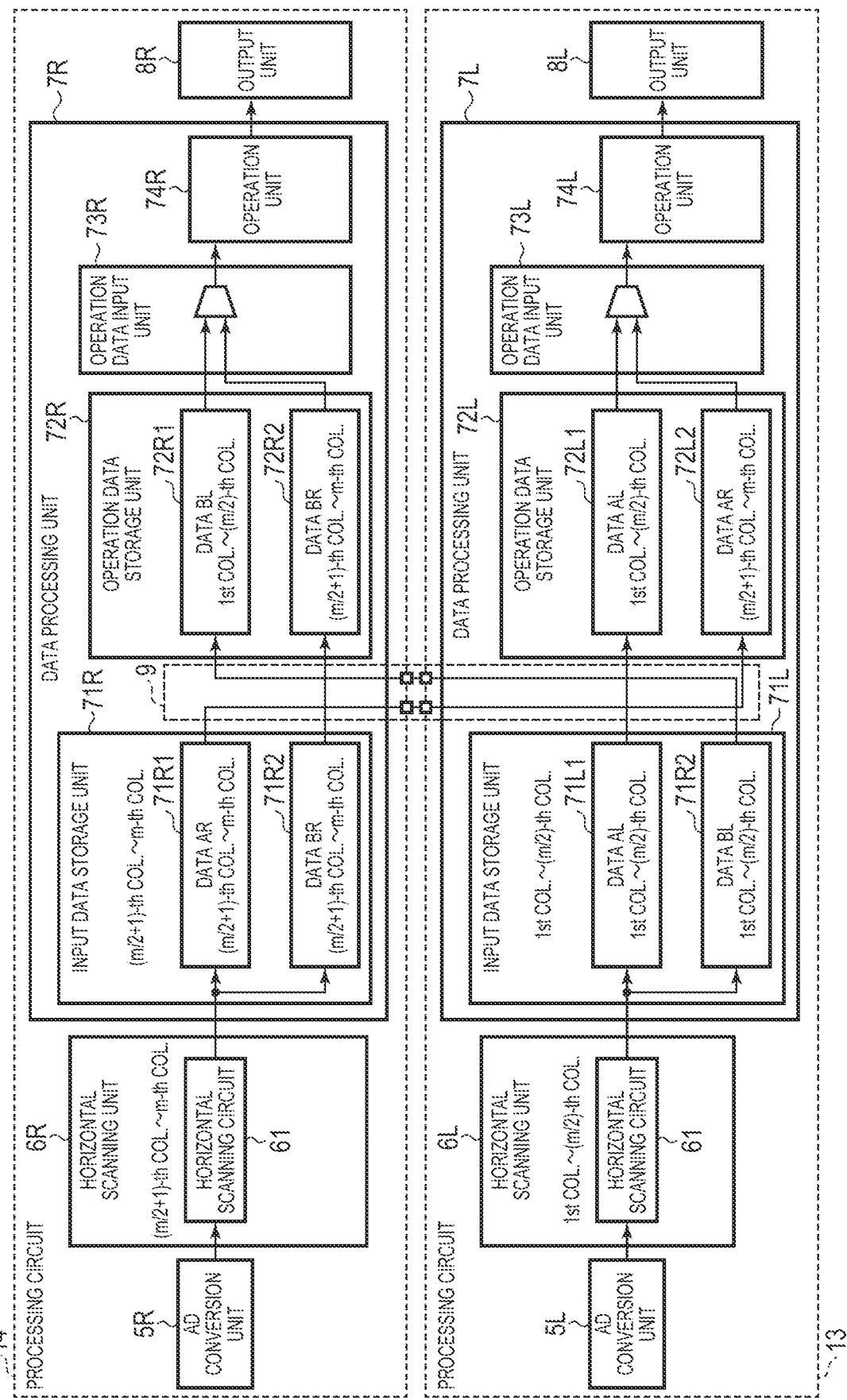
FIG. 11 is a block diagram illustrating a configuration example of processing circuits in an imaging device according to the third embodiment.

An imaging device according to a third embodiment will be described with reference to FIG. 8 to FIG. 11. FIG. 8 is a circuit diagram illustrating a configuration example of a pixel in the imaging device according to the present embodiment. FIG. 9 is a schematic top view of the pixel in the imaging device according to the present embodiment. FIG. 10 is a diagram illustrating a connection relationship between a pixel unit, a vertical scanning unit, an AD conversion unit, and a horizontal scanning unit in the imaging device according to the present embodiment. FIG. 11 is a block diagram illustrating a configuration example of a processing circuit in the imaging device according to the present embodiment. The same components as those of the imaging device according to the first and second embodiments are denoted by the same reference numerals, and the description thereof will be omitted or simplified.

In the present embodiment, an example is described in which the image generation data and the focus detection data are separated and output simultaneously in the imaging device having the image plane phase difference AF function.

The imaging device 10 according to the present embodiment has the same schematic configuration as that of the imaging device according to the first embodiment except that the circuit configuration of the pixel P is different. Hereinafter, the imaging device according to the present embodiment will be described focusing on points different from the imaging device according to the first embodiment.

As illustrated in FIG. 8, each of the pixels P in the imaging device 10 according to the present embodiment may include photoelectric converters PDA and PDB, transfer transistors M1A and M1B, a reset transistor M2, an amplifier transistor M3, and a select transistor M4.

The photoelectric converters PDA and PDB may be configured by photoelectric conversion elements such as photodiodes and photogates. Here, it is assumed that the photoelectric converters PDA and PDB are formed of photodiodes. The photodiode constituting the photoelectric converter PDA has an anode connected to the ground node and a cathode connected to the source of the transfer transistor M1A. The photodiode constituting the photoelectric converter PDB has an anode connected to the ground node and a cathode connected to the source of the transfer transistor M1B. The drain of the transfer transistor M1A and the drain of the transfer transistor M1B are connected to the source of the reset transistor M2 and the gate of the amplifier transistor M3. A connection node between the drain of the transfer transistor M1A, the drain of the transfer transistor M1B, the source of the reset transistor M2, and the gate of the amplifier transistor M3 is a floating diffusion portion FD. The drain of the reset transistor M2 and the drain of the amplifier transistor M3 are connected to a power supply voltage node (voltage VCC). The source of the amplifier transistor M3 is connected to the drain of the select transistor M4. The source of the select transistor M4 is connected to the vertical output line Vline.

In the case of the pixel configuration illustrated in FIG. 8, each of the control lines arranged in each row of the pixel unit 4 includes a transfer gate signal line connected to the gate of the transfer transistor M1A and a transfer gate signal line connected to the gate of the transfer transistor M1B. The control line in each row further includes a reset signal line connected to the gate of the reset transistor M2 and a selection signal line connected to the gate of the select transistor M4.

Control signals PTXA (N), PTXB (N), PRES (N), and PSEL (N) are supplied from the vertical scanning unit 3 to the pixels P arranged in the N-th row. The control signal PTXA (N) is a control signal supplied to the gates of the transfer transistors M1A of the pixels P of the N-th row. The control signal PTXB (N) is a control signal supplied to the gates of the transfer transistors M1B of the pixels P of the N-th row. The control signal PRES (N) is a control signal supplied to the gates of the reset transistors M2 of the pixels P of the N-th row. The control signal PSEL (N) is a control signal supplied to the gates of the select transistors M4 of the pixels P of the N-th row. A common control signal is supplied from the vertical scanning unit 3 to the pixels P in the same row.

When each transistor is formed of an n-channel transistor, when a high-level control signal is supplied from the vertical scanning unit 3, the corresponding transistor is turned on, and when a low-level control signal is supplied from the vertical scanning unit 3, the corresponding transistor is turned off. Here, the high level corresponds to the logical value "1", and the low level corresponds to the logical value "0". Each transistor included in the pixel P may be configured by an n-channel transistor, but may be configured by a p-channel transistor.

The photoelectric converters PDA and PDB convert (photoelectrically convert) incident light into charge of an amount corresponding to the amount of light, and accumulate the generated charge. When the transfer transistor M1A is turned on (conductive state), the charge held by the photoelectric converter PDA is transferred to the floating diffusion portion FD. When the transfer transistor M1B is turned on (conductive state), the charge held by the photoelectric converter PDB is transferred to the floating diffusion portion FD. The floating diffusion portion FD includes a capacitance component, holds charges transferred from the photoelectric converters PDA and PDB, and sets the potential of the floating diffusion portion FD to a potential corresponding to the amount of charges by charge-voltage conversion by the capacitance component thereof. The amplifier transistor M3 has a configuration in which a power supply voltage VCC is supplied to the drain thereof, and a bias current is supplied to the source thereof from a current source (not illustrated) via the vertical output line Vline and the select transistor M4, and constitutes a source follower circuit having a gate as an input node. Thus, the amplifier transistor M3 outputs a signal based on the potential of the floating diffusion portion FD to the vertical output line Vline via the select transistor M4. The reset transistor M2 is turned on to reset the floating diffusion portion FD to a potential corresponding to the power supply voltage. Further, by turning on (conductive state) the transfer transistors M1A and M1B simultaneously with the reset transistor M2, the photoelectric converters PDA and PDB may be reset to a potential corresponding to the power supply voltage. The select transistor M4 switches the connection between the amplifier transistor M3 and the vertical output line Vline.

Further, the photoelectric converter PDA and the photoelectric converter PDB constituting one pixel P share one microlens ML, for example, as illustrated in FIG. 9. In other words, the photoelectric converter PDA and the photoelectric converter PDB are configured to receive light that has passed through different pupil regions of light incident on the imaging optical system. With this configuration, the signal based on the charge generated by the photoelectric converter PDA and the signal based on the charge generated by the photoelectric converter PDB may be used as signals for focus detection.

In the pixel P of the present embodiment, the charge of the photoelectric converter PDA and the charge of the photoelectric converter PDB are individually transferred. First, the charge of the photoelectric converter PDA is transferred to the floating diffusion portion FD by the transfer transistor M1A, and the signal output from the pixel P is processed for AD conversion by the AD conversion unit 5. Next, the charge of the photoelectric converter PDB is transferred to the floating diffusion portion FD by the transfer transistor M1B, and the signal output from the pixel P is processed for AD conversion by the AD conversion unit 5. That is, in the imaging device of the present embodiment, two types of data are obtained for one exposure.

As illustrated in FIG. 10, a signal line to which the control signal PRES is supplied, a signal line to which the control signal PTXA is supplied, a signal line to which the control signal PTXB is supplied, and a signal line to which the control signal PSEL is supplied are provided in each row of the pixel array constituting the pixel unit 4. These signal lines are connected to a plurality of pixels P arranged in a corresponding row. For example, the signal lines arranged in the i-th row are connected to the pixels P (1, i), . . . , P (j, i), P (j+1, i), . . . , P (m, i). Each of these signal lines is connected to the vertical scanning unit 3 provided on the signal processing substrate 12 via an electrical connection portion between the pixel substrate 11 and the signal processing substrate 12.

As illustrated in FIG. 10, one vertical output line Vline is provided in each column of the pixel array constituting the pixel unit 4. For example, the vertical output line Vline (j) is provided in the j-th column. All pixels P arranged in the j-th column are connected to the vertical output line Vline (j). The vertical output line Vline of each column reads out pixel data from the pixels P of the corresponding column in response to the control signals PRES, PTXA, PTXB, and PSEL supplied from the vertical scanning unit 3. Each vertical output line Vline is connected to the AD conversion unit 5 provided on the signal processing substrate 12 via an electrical connection portion between the pixel substrate 11 and the signal processing substrate 12.

The AD conversion unit 5 includes a plurality of (m) column circuits 52 corresponding to respective columns of the pixel array of n rows and m columns constituting the pixel unit 4. The vertical output line Vline of each column is connected to the column circuit 52 of the corresponding column. For example, the vertical output line Vline (j) of the j-th column is connected to the column circuit 52 (j) corresponding to the j-th column. The horizontal scanning unit 6 includes a horizontal scanning circuit 61. Each column circuit 52 is connected to a horizontal scanning circuit 61. The horizontal scanning circuit 61 is connected to the data processing unit 7.

As described above, each of the AD conversion unit 5, the horizontal scanning unit 6, the data processing unit 7, and the output unit 8 is divided into the processing circuit 13 and the processing circuit 14. The half of the m×8 column circuits 52 constituting the AD conversion unit 5 is arranged in the processing circuit 13, and the remaining half is arranged in the processing circuit 14. The vertical output lines Vline of the respective columns from the first column to the (m/2)-th column are connected to the column circuit 52 arranged in the processing circuit 13. The vertical output lines Vline of the respective columns from the (m/2+1)-th column to the m-th column are connected to the column circuit 52 arranged in the processing circuit 14. The horizontal scanning circuit 61 arranged in the processing circuit 13 sequentially and horizontally transfers digital data of the pixels P from the first column to the (m/2)-th column, and outputs the digital data to the data processing unit 7 of the processing circuit 13. The horizontal scanning circuit 61 arranged in the processing circuit 14 sequentially horizontally transfers digital data of the pixels P from the (m/2+1)-th column to the m-th column, and outputs the digital data to the data processing unit 7 of the processing circuit 14.

In the present embodiment, two types of data are acquired for one exposure of one pixel P. In the readout operation of the pixel P, first, the charge of the photoelectric converter PDA is transferred to the floating diffusion portion FD by the transfer transistor M1A, and the signal output from the pixel P is processed for AD conversion by the AD conversion unit 5. The digital data generated in this way is called data A. Next, the charge of the photoelectric converter PDB is transferred to the floating diffusion portion FD by the transfer transistor M1B, and the signal output from the pixel P is processed for AD conversion by the AD conversion unit 5. The digital data generated in this way is called data B. The data A may be a signal corresponding to the amount of charge generated in the photoelectric converter PDA during a predetermined exposure period. The data B may be a signal corresponding to the amount of charges generated in the photoelectric converters PDA and PDB during a predetermined exposure period.

Next, a configuration example of the processing circuit 13 and the processing circuit 14 in the imaging device according to the present embodiment will be described in more detail with reference to FIG. 11.

The processing circuit 13 includes an AD conversion unit 5L, a horizontal scanning unit 6L, a data processing unit 7L, and an output unit 8L. The processing circuit 14 includes an AD conversion unit 5R, a horizontal scanning unit 6R, a data processing unit 7R, and an output unit 8R. The AD conversion units 5L and 5R and the horizontal scanning units 6L and 6R are as described with reference to FIG. 10.

The data processing unit 7L may include an input data storage unit 71L, an operation data storage unit 72L, an operation data input unit 73L, and an operation unit 74L. Each of the input data storage unit 71L and the operation data storage unit 72L includes a number of memories corresponding to the types of data (two types in this case) output by the pixel P. For example, the input data storage unit 71L includes two memories 71L1 and 71L2. The operation data storage unit 72L includes two memories 72L1 and 72L2.

Similarly, the data processing unit 7R may include an input data storage unit 71R, an operation data storage unit 72R, an operation data input unit 73R, and an operation unit 74R. Each of the input data storage unit 71R and the operation data storage unit 72R includes a number of memories corresponding to the types of data (two types in this case) output by the pixel P. For example, the input data storage unit 71R includes two memories 71R1 and 71R2. The operation data storage unit 72R includes two memories 72R1 and 72R2.

The horizontal scanning circuit 61 of the horizontal scanning unit 6L is connected to the memory 71L1 and the memory 71L2 of the input data storage unit 71L. The horizontal scanning circuit 61 of the horizontal scanning unit 6R is connected to the memory 71R1 and the memory 71R2 of the input data storage unit 71R.

The memory 71L1 of the input data storage unit 71L is connected to the memory 72L1 of the operation data storage unit 72L. The memory 71L2 of the input data storage unit 71L is connected to the memory 72R1 of the operation data storage unit 72R. The memory 71R1 of the input data storage unit 71R is connected to the memory 72L2 of the operation data storage unit 72L. The memory 71R2 of the input data storage unit 71R is connected to the memory 72R2 of the operation data storage unit 72R.

The operation data input unit 73L is connected to the operation unit 74L. The operation unit 74L is connected to the output unit 8L. Similarly, the operation data input unit 73R is connected to the operation unit 74R. The operation unit 74R is connected to the output unit 8R.

Next, the operation of the processing circuits 13 and 14 will be described with reference to FIG. 11.

The data A read out from the vertical output line Vline of each column from the first column to the (m/2)-th column is sequentially transferred by the horizontal scanning circuit 61 of the horizontal scanning unit 6L and stored in the memory 71L1 of the input data storage unit 71L. This data is called data AL.

The data B read out from the vertical output line Vline of each column from the first column to the (m/2)-th column is sequentially transferred by the horizontal scanning circuit 61 of the horizontal scanning unit 6L and stored in the memory 71L2 of the input data storage unit 71L. This data is called data BL.

Similarly, the data A read out from the vertical output line Vline of each column from the (m/2+1)-th column to the m-th column is sequentially transferred by the horizontal scanning circuit 61 of the horizontal scanning unit 6R and stored in the memory 71R1 of the input data storage unit 71R. This data is called data AR.

The data B read out from the vertical output line Vline of each column from the (m/2+1)-th column to the m-th column is sequentially transferred by the horizontal scanning circuit 61 of the horizontal scanning unit 6R and stored in the memory 71R2 of the input data storage unit 71R. This data is called data BR.

Among the data stored in the input data storage unit 71L, the data AL stored in the memory 71L1 is transferred to the memory 72L1 of the operation data storage unit 72L. Among the data stored in the input data storage unit 71L, the data BL stored in the memory 71L2 is transferred to the memory 72R1 of the operation data storage unit 72R.

Among the data stored in the input data storage unit 71R, the data AR stored in the memory 71R1 is transferred to the memory 72L2 of the operation data storage unit 72L. Among the data stored in the input data storage unit 71R, the data BR stored in the memory 71R2 is transferred to the memory 72R2 of the operation data storage unit 72R.

That is, in the present embodiment, the data BL is transferred from the processing circuit 13 to the processing circuit 14, and the data AR is transferred from the processing circuit 14 to the processing circuit 13.

Thus, the data A (data AL, AR) read out from the pixels P from the first column to the m-th column is stored in the operation data storage unit 72L. The operation data storage unit 72R stores data B (data BL, BR) read out from the pixels P in the first column to the m-th column.

The pixel data stored in the operation data storage unit 72L in this way is the data A (data AL, AR) output from the pixels P in each column. On the other hand, the pixel data stored in the operation data storage unit 72R in this manner is the data B (data BL, BR) output from the pixels Pin each column. That is, two types of pixel data different from each other may be separately stored in the operation data storage unit 72L and the operation data storage unit 72R.

The data stored in the operation data storage unit 72L is read out by the operation data input unit 73L, subjected to operation processing by the operation unit 74L, and output from the output unit 8L. Similarly, the data stored in the operation data storage unit 72R is read by the operation data input unit 73R, subjected to operation processing by the operation unit 74R, and output from the output unit 8R. Since the operation unit 74L and the operation unit 74R are independent from each other, different operation processes may be performed simultaneously in each of the operation units 74L and 74R. Thus, data corresponding to two different types of pixel readout methods may be separated and output simultaneously.

The data B output from the output unit 8L in this manner may be used as image generation data. The data A and the data B output from the output units 8L and 8R in this manner may be used as focus detection data.

As described above, according to the present embodiment, efficient processing of pixel data may be realized without increasing the circuit scale.

Fourth Embodiment

An imaging device according to a fourth embodiment will be described with reference to FIG. 12 to FIG. 14. The same components as those of the imaging device according to the first to third embodiments are denoted by the same reference numerals, and the description thereof will be omitted or simplified.

In this embodiment, a layout example of each functional block on the signal processing substrate 12 is described. FIG. 12 to FIG. 14 are plan views illustrating layout examples of respective functional blocks on the signal processing substrate of the imaging device according to the present embodiment. The layout example described in this embodiment is applicable to any of the first to third embodiments.

Figure 12:
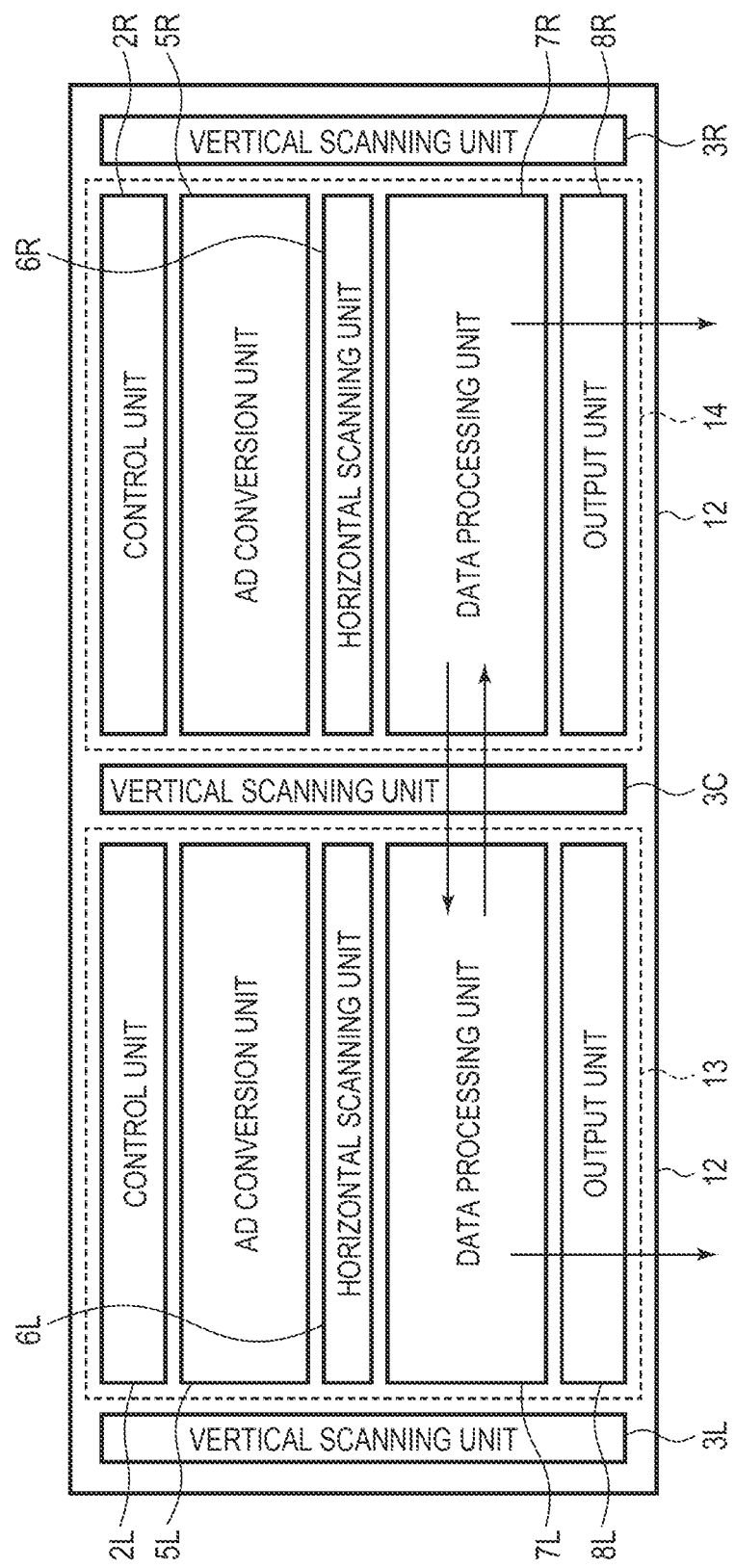
FIG. 12, FIG. 13, and FIG. 14 are plan views illustrating layout examples of the functional blocks on the signal processing substrate of the imaging device according to a fourth embodiment.

FIG. 12 illustrates an example in which the control unit 2L, the AD conversion unit 5L, the horizontal scanning unit 6L, the data processing unit 7L, and the output unit 8L are arranged in the processing circuit 13, and the control unit 2R, the AD conversion unit 5R, the horizontal scanning unit 6R, the data processing unit 7R, and the output unit 8R are arranged in the processing circuit 14. The control unit 2L, the AD conversion unit 5L, the horizontal scanning unit 6L, the data processing unit 7L, and the output unit 8L are arranged in this order in the vertical direction between the vertical scanning unit 3C and the vertical scanning unit 3L. Similarly, the control unit 2R, the AD conversion unit 5R, the horizontal scanning unit 6R, the data processing unit 7R, and the output unit 8R are arranged in this order along the column direction between the vertical scanning unit 3C and the vertical scanning unit 3R.

In this layout, the data stored in the data processing unit 7L and the data stored in the data processing unit 7R may be transferred in the horizontal direction as indicated by arrows in FIG. 12. The data output from the output units 8L and 8R may be output from one side of the signal processing substrate 12 along the horizontal direction.

Figure 13:
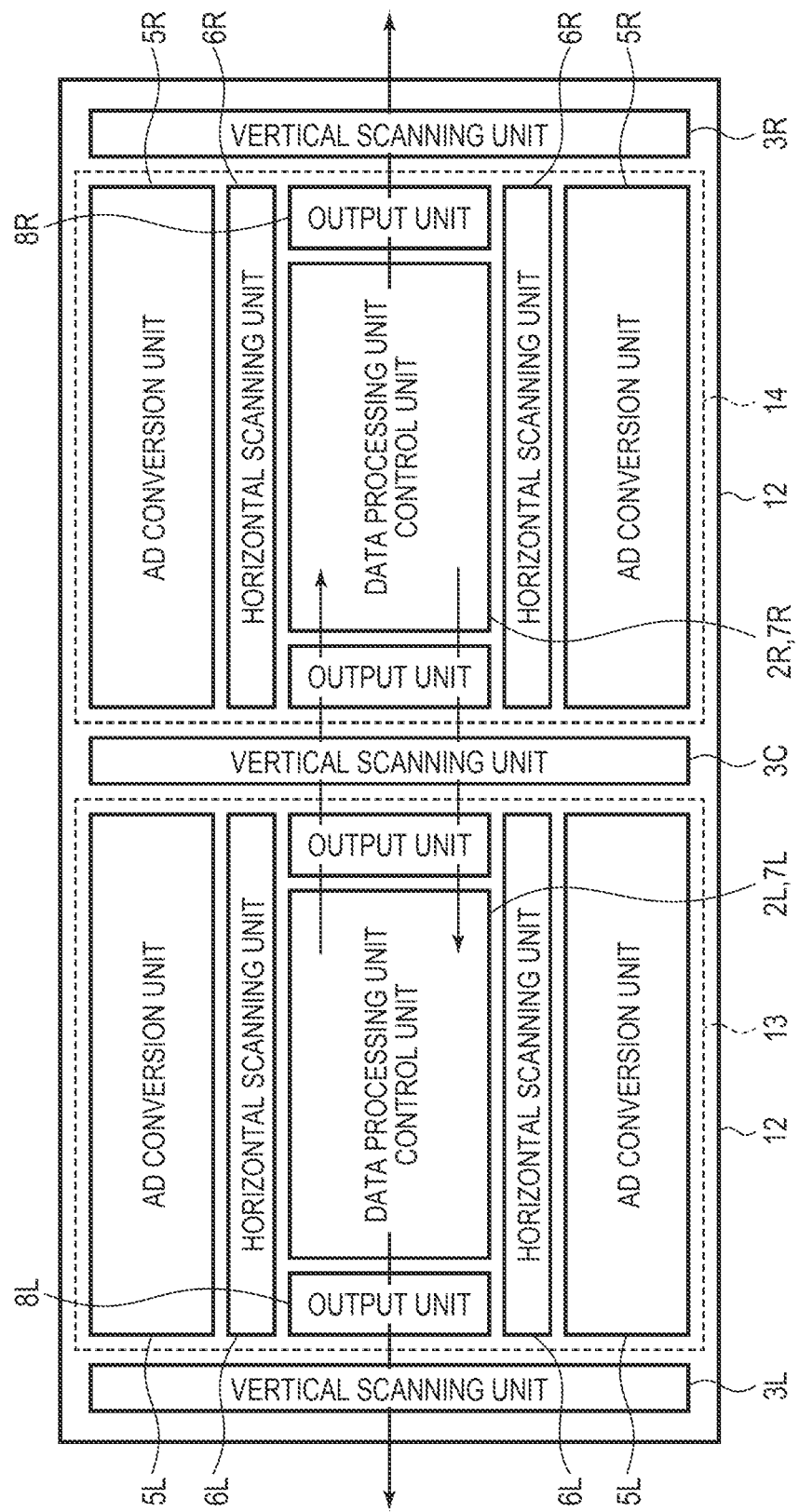

FIG. 13 illustrates an example in which one control unit 2L or 2R and one data processing unit 7L or 7R are arranged in each of the processing circuit 13 and the processing circuit 14, and two AD conversion units 5L or 5R, two horizontal scanning units 6L or 6R, and two output units 8L or 8R are arranged in each of the processing circuit 13 and the processing circuit 14. The AD conversion unit 5L, the horizontal scanning unit 6L, the control unit 2L, the data processing unit 7L, and the output unit 8L, the horizontal scanning unit 6L, and the AD conversion unit 5L are arranged in this order along the vertical direction between the vertical scanning unit 3C and the vertical scanning unit 3L. The output unit 8L, the control unit 2L, the data processing unit 7L, and the output unit 8L are arranged in this order along the horizontal direction. Similarly, the AD conversion unit 5R, the horizontal scanning unit 6R, the control unit 2R, the data processing unit 7R, and the output unit 8R, the horizontal scanning unit 6R, and the AD conversion unit 5R are arranged in this order along the vertical direction between the vertical scanning unit 3C and the vertical scanning unit 3R. The output unit 8R, the control unit 2R, the data processing unit 7R, and the output unit 8R are arranged in this order along the horizontal direction.

In this layout, in each of the processing circuit 13 and the processing circuit 14, two AD conversion units 5 are arranged at two physically separated locations, and the AD-converted data is collected in the data processing unit 7 arranged at the center of each region. The data stored in the data processing unit 7L and the data stored in the data processing unit 7R may be transferred in the horizontal direction as indicated by arrows in FIG. 13. The data output from the output units 8L and 8R may be output from two sides along the vertical direction of the signal processing substrate 12.

Figure 14:
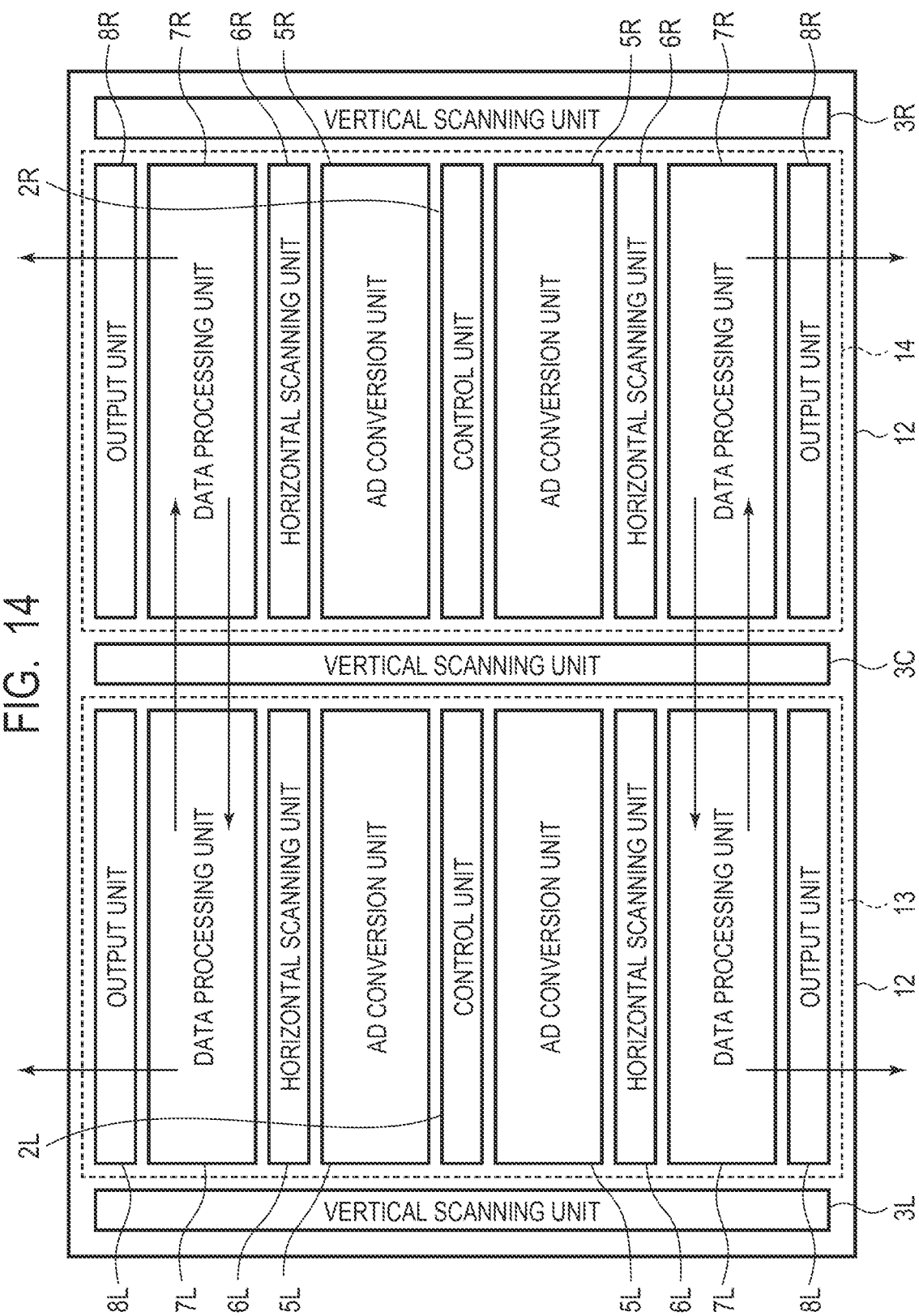

FIG. 14 illustrates an example in which one control unit 2L or 2R, two AD conversion units 5L or 5R, two horizontal scanning units 6L or 6R, two data processing units 7L or 7R, and two output units 8L or 8R are arranged in each of the processing circuit 13 and the processing circuit 14. The output unit 8L, the data processing unit 7L, the horizontal scanning unit 6L, the AD conversion unit 5L, the control unit 2L, the AD conversion unit 5L, the horizontal scanning unit 6L, the data processing unit 7L, and the output unit 8L are arranged in this order along the vertical direction between the vertical scanning unit 3C and the vertical scanning unit 3L. Similarly, the output unit 8R, the data processing unit 7R, the horizontal scanning unit 6R, the AD conversion unit 5R, the control unit 2R, the AD conversion unit 5R, the horizontal scanning unit 6R, the data processing unit 7R, and the output unit 8R are arranged in this order in the vertical direction between the vertical scanning unit 3C and the vertical scanning unit 3R.

In this layout, the data stored in the data processing unit 7L and the data stored in the data processing unit 7R may be transferred in the horizontal direction as indicated by arrows in FIG. 14. The data output from the output units 8L and 8R may be output from two sides along the horizontal direction of the signal processing substrate 12.

Fifth Embodiment

Figure 15:
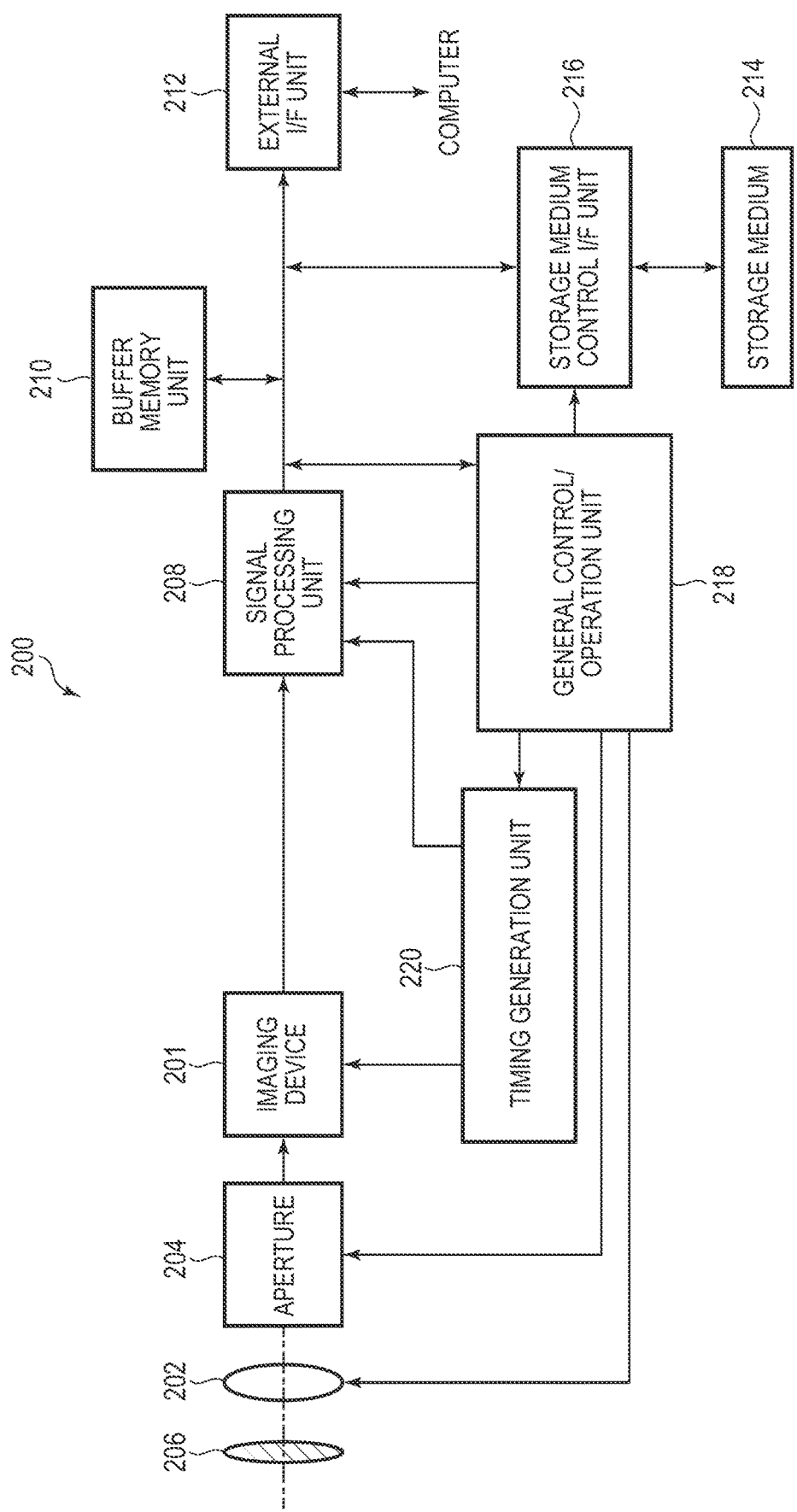
FIG. 15 is a block diagram illustrating a schematic configuration of an imaging system according to a fifth embodiment.

An imaging system according to the fifth embodiment will be described with reference to FIG. 15. FIG. 15 is a block diagram illustrating a schematic configuration of an imaging system according to the present embodiment.

The imaging device 10 described in the first to fourth embodiments is applicable to various imaging systems. Examples of applicable imaging systems include a digital still camera, a digital camcorder, a surveillance camera, a copier, a fax, a cellular phone, an in-vehicle camera, and an observation satellite. A camera module including an optical system such as a lens and an imaging device is also included in the imaging system. FIG. 15 illustrates a block diagram of a digital still camera as an example of them.

The imaging system 200 illustrated in FIG. 15 includes an imaging device 201, a lens 202 that forms an optical image of an object on the imaging device 201, an aperture 204 that varies the amount of light passing through the lens 202, and a barrier 206 that protects the lens 202. The lens 202 and the aperture 204 are optical systems for focusing light on the imaging device 201. The imaging device 201 is the imaging device 10 described in any of the first to fourth embodiments, and converts the optical image formed by the lens 202 into image data.

The imaging system 200 also includes a signal processing unit 208 that processes an output signal output from the imaging device 201. The signal processing unit 208 generates image data from the digital signal output from the imaging device 201. The signal processing unit 208 may perform various types of correction and compression as necessary to output image data. The imaging device 201 may include an AD conversion unit that generates a digital signal to be processed by the signal processing unit 208. The AD conversion unit may be formed on a semiconductor layer (semiconductor substrate) on which the photoelectric converter of the imaging device 201 is formed, or may be formed on a semiconductor substrate different from the semiconductor layer on which the photoelectric converter of the imaging device 201 is formed. The signal processing unit 208 may be formed on the same semiconductor substrate as the imaging device 201.

The imaging system 200 further includes a buffer memory unit 210 that temporarily stores image data, and an external interface unit (external I/F unit) 212 that communicates with an external computer or the like. The imaging system 200 further includes a storage medium 214 such as a semiconductor memory that stores or reads out image data, and a storage medium control interface unit (storage medium control I/F unit) 216 that records or reads out image data on or from the storage medium 214. The storage medium 214 may be built in the imaging system 200 or may be detachable.

The imaging system 200 further includes a general control/operation unit 218 that controls various operations and the entire digital still camera, and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes the output signal output from the imaging device 201.

The imaging device 201 outputs an imaging signal to the signal processing unit 208. The signal processing unit 208 performs predetermined signal processing on an imaging signal output from the imaging device 201, and outputs image data. The signal processing unit 208 generates an image using the imaging signal.

As described above, according to the present embodiment, an imaging system to which the imaging device 10 according to the first to fourth embodiments is applied may be realized.

Sixth Embodiment

Figure 16A:
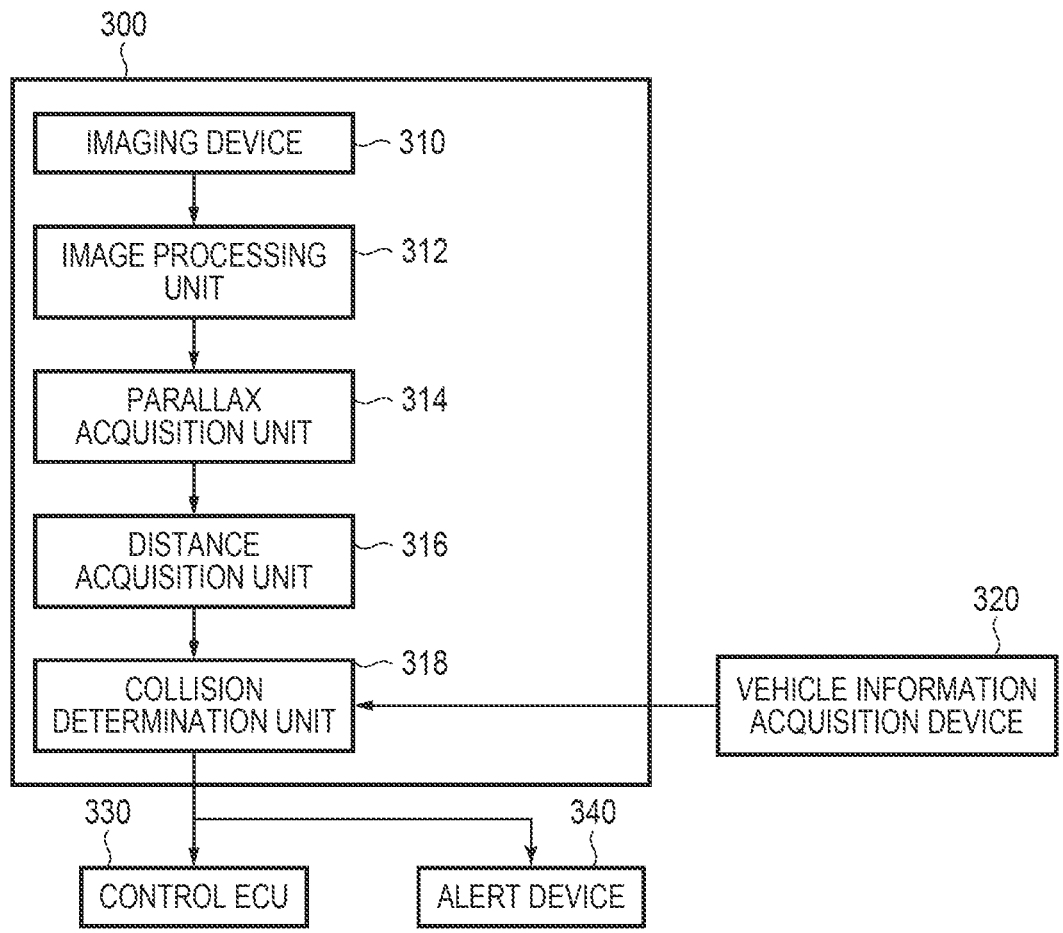
FIG. 16A is a diagram illustrating a configuration example of an imaging system according to a sixth embodiment.
Figure 16B:
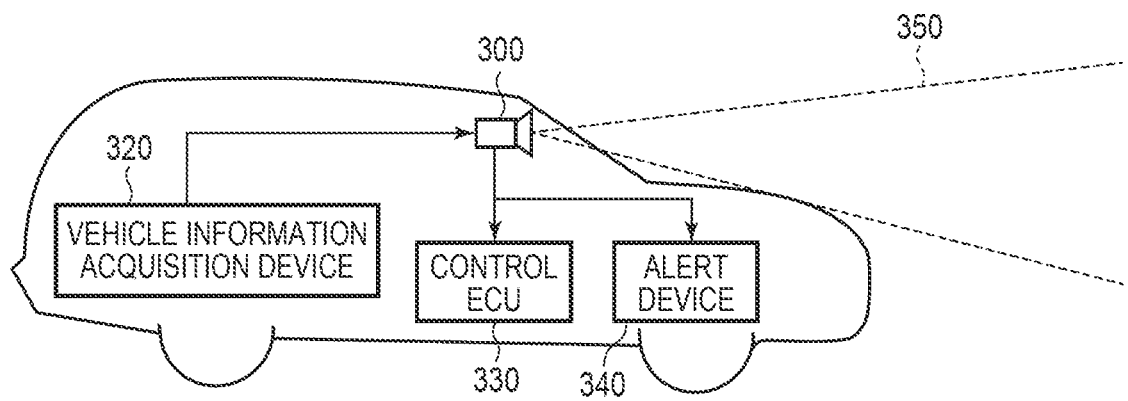
FIG. 16B is a diagram illustrating a configuration example of a movable object according to the sixth embodiment.

An imaging system and a movable object according to the sixth embodiment will be described with reference to FIG. 16A and FIG. 16B. FIG. 16A is a diagram illustrating a configuration of an imaging system according to the present embodiment. FIG. 16B is a diagram illustrating a configuration of a movable object according to the present embodiment.

FIG. 16A illustrates an example of an imaging system related to an in-vehicle camera. The imaging system 300 includes an imaging device 310. The imaging device 310 is the imaging device 10 according to any one of the first to fourth embodiments. The imaging system 300 includes an image processing unit 312 that performs image processing on a plurality of image data acquired by the imaging device 310, and a parallax acquisition unit 314 that calculates parallax (phase difference of parallax images) from the plurality of image data acquired by the imaging device 310. The imaging system 300 also includes a distance acquisition unit 316 that calculates the distance to the object based on the calculated parallax, and a collision determination unit 318 that determines whether there is a possibility of collision based on the calculated distance. Here, the parallax acquisition unit 314 and the distance acquisition unit 316 are an example of a distance information acquisition unit that acquires distance information to the object. That is, the distance information is information related to parallax, defocus amount, distance to the object, and the like. The collision determination unit 318 may determine the possibility of collision using any of the distance information. The distance information acquisition means may be realized by hardware designed exclusively, or may be realized by a software module. It may be realized by FPGA (Field Programmable Gate Array), ASIC (Application Specific Integrated circuit), or the like, or may be realized by a combination of these.

The imaging system 300 is connected to the vehicle information acquisition device 320, and may acquire vehicle information such as a vehicle speed, a yaw rate, and a steering angle. Further, the imaging system 300 is connected to a control ECU 330, which is a control device that outputs a control signal for generating braking force to the vehicle based on the determination result obtained by the collision determination unit 318. The imaging system 300 is also connected to an alert device 340 that issues an alert to the driver based on the determination result obtained by the collision determination unit 318. For example, when the collision possibility is high as the determination result of the collision determination unit 318, the control ECU 330 performs vehicle control to avoid collision and reduce damage by applying a brake, returning an accelerator, suppressing engine output, or the like. The alert device 340 sounds an alarm such as a sound, displays alert information on a screen of a car navigation system or the like, and provides a warning to the user by applying vibration to a seatbelt or steering.

In the present embodiment, an image of the periphery of the vehicle, for example, the front or the rear is captured by the imaging system 300. FIG. 16B illustrates an imaging system in the case of capturing an image of the front of the vehicle (imaging range 350). The vehicle information acquisition device 320 sends an instruction to the imaging system 300 or the imaging device 310. With such a configuration, the accuracy of distance measurement may be further improved.

Although an example in which the vehicle is controlled so as not to collide with another vehicle has been described above, the present disclosure is also applicable to a control in which the vehicle is automatically driven following another vehicle, a control in which the vehicle is automatically driven so as not to protrude from a lane, and the like. Further, the imaging system may be applied not only to a vehicle such as a host vehicle, but also to a movable object (mobile device) such as a ship, an aircraft, or an industrial robot. In addition, the present invention can be applied not only to a movable object but also to an apparatus using object recognition in a wide range such as an advanced road traffic system (ITS).

MODIFIED EMBODIMENTS

The present invention is not limited to the above embodiments, and various modifications are possible.

For example, an example in which a configuration of a part of any embodiment is added to another embodiment or an example in which a configuration of a part of another embodiment is substituted is also an embodiment of the present disclosure.

Further, in the embodiments described above, an application example to a stacked imaging device in which a pixel substrate and a signal processing substrate are stacked is described, but the present disclosure is not necessarily limited to a stacked imaging device, and the present disclosure may be widely applied to an imaging device in which a signal processing circuit is divided into a plurality of regions.

In the above-described embodiment, the signal processing circuit is divided into two areas having different columns, and data is exchanged between these areas, but the manner in which the signal processing circuit is divided is not limited to this. For example, the signal processing circuit may be divided into three or more regions different in corresponding columns, and data may be exchanged between these regions. In addition to the horizontal division, the signal processing circuit may be divided into two or more regions in which corresponding rows are made different.

Although the first to fourth embodiments exemplify a device for the purpose of acquiring an image, that is, an imaging device, an application example of the present disclosure is not necessarily limited to the imaging device. For example, in the case where the present invention is applied to an apparatus mainly targeted for distance measurement as described in the sixth embodiment, it is not always necessary to output an image. In such a case, the device may be said to be a photoelectric conversion device that converts optical information into a predetermined electric signal. The imaging device is one of photoelectric conversion devices.

The imaging systems illustrated in the fifth and sixth embodiments are examples of imaging systems to which the imaging device of the present disclosure may be applied, and the imaging systems to which the imaging device of the present disclosure may be applied are not limited to the configurations illustrated in FIG. 15 and FIG. 16A.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-152620, filed Sep. 11, 2020, which is hereby incorporated by reference herein in its entirety.

What is claimed is:

1. A photoelectric conversion device comprising:
a pixel unit in which a plurality of pixels each including a photoelectric converter is arranged to form a plurality of rows and a plurality of columns; and
a processing circuit configured to process a signal output from the pixel unit,
wherein the pixel unit includes a first region and a second region defined by columns, and is configured to output a plurality of kinds of signals including a first signal and a second signal from each of columns belonging to the first region and the second region,
wherein the processing circuit includes a first processing circuit including a first memory and a third memory, a second processing circuit including a second memory and a fourth memory, and a data exchange circuit,
wherein the first memory is configured to store the first signal and the second signal output from each column of the first region,
wherein the second memory is configured to store the first signal and the second signal output from each column of the second region,
wherein the data exchange circuit is configured to read out the first signal stored in the first memory and the first signal stored in the second memory to store them in the third memory, and read out the second signal stored in the first memory and the second signal stored in the second memory to store them in the fourth memory, and
wherein the processing circuit is configured to output the first signals of the first region and the second region stored in the third memory from the first processing circuit, and to output the second signals of the first region and the second region stored in the fourth memory from the second processing circuit.

2. The photoelectric conversion device according to claim 1, wherein the processing circuit is configured to simultaneously output the first signals of the first region and the second region stored in the third memory and the second signals of the first region and the second region stored in the fourth memory.

3. The photoelectric conversion device according to claim 1,
wherein the first signal is a signal obtained by adding signals of a first number of pixels, and
wherein the second signal is a signal obtained by adding signals of a second number of pixels different from the first number.

4. The photoelectric conversion device according to claim 3, wherein a plurality of output lines including a first output line and a second output line is arranged in each column of the pixel unit, and the first signal is output to the first output line and the second signal is output to the second output line.

5. The photoelectric conversion device according to claim 1,
wherein the first signal is a signal output from a pixel belonging to a first row, and
wherein the second signal is a signal output from a pixel belonging to a second row different from the first row.

6. The photoelectric conversion device according to claim 5, wherein the first row and the second row are adjacent rows.

7. The photoelectric conversion device according to claim 5,
wherein the first signal is a signal output from a pixel of a first color, and
wherein the second signal is a signal output from a pixel of a second color different from the first color.

8. The photoelectric conversion device according to claim 1,
wherein each of the plurality of pixels includes a first photoelectric converter and a second photoelectric converter,
wherein the first signal is a signal for focus detection based on charge generated in the first photoelectric converter, and
wherein the second signal is a signal for image generation based on charges generated in the first photoelectric converter and the second photoelectric converter.

9. The photoelectric conversion device according to claim 1,
wherein the processing circuit further includes an analog-to-digital conversion unit, and
wherein the first signal and the second signal are digital signals converted from analog signals by the analog-to-digital converter.

10. The photoelectric conversion device according to claim 1, wherein the first processing circuit and the second processing circuit are spaced apart from each other.

11. The photoelectric conversion device according to claim 1, wherein a vertical scanning unit configured to drive the plurality of pixels row-by-row is arranged between the first processing circuit and the second processing circuit.

12. The photoelectric conversion device according to claim 1, wherein a pixel substrate on which the pixel unit is provided and a signal processing substrate on which the processing circuit is provided are stacked.

13. An imaging system comprising:
the photoelectric conversion device according to claim 1; and
a signal processing unit configured to process a signal output from the photoelectric conversion device.

14. A movable object comprising:
the photoelectric conversion device according to claim 8;
a distance information acquisition unit configured to acquire distance information to an object from parallax images based on the first signal and the second signal; and
a control configured to control the movable object based on the distance information.

* * * * *